United States Patent [19]
Van Der Vegt et al.

[11] Patent Number: 6,144,893
[45] Date of Patent: Nov. 7, 2000

[54] METHOD AND COMPUTER SYSTEM FOR CONTROLLING AN INDUSTRIAL PROCESS BY ANALYSIS OF BOTTLENECKS

[75] Inventors: Anton Hans Van Der Vegt, Bondi Beach; Ian Chetwynd Thompson, Clareville, both of Australia

[73] Assignee: Hagen Method (Pty) Ltd., Newport, Australia

[21] Appl. No.: 09/027,098

[22] Filed: Feb. 20, 1998

[51] Int. Cl.[7] .................................................. G06F 19/00
[52] U.S. Cl. ........................... 700/108; 700/95; 700/100; 700/109; 700/117; 705/7; 705/8; 705/9; 705/400
[58] Field of Search ................ 700/95, 108, 97, 700/99, 100, 101, 109, 115, 116, 117; 705/7, 8, 9, 400

[56] References Cited

U.S. PATENT DOCUMENTS

| | | |
|---|---|---|
| 5,077,661 | 12/1991 | Jain et al. . |
| 5,233,533 | 8/1993 | Edstrom et al. ........................ 700/98 |
| 5,249,120 | 9/1993 | Foley . |
| 5,260,868 | 11/1993 | Gupta et al. . |
| 5,291,397 | 3/1994 | Powell . |
| 5,369,570 | 11/1994 | Parad . |
| 5,446,671 | 8/1995 | Weaver et al. ........................ 700/100 |
| 5,524,077 | 6/1996 | Faaland et al. . |
| 5,532,928 | 7/1996 | Stanczyk et al. . |
| 5,748,478 | 5/1998 | Pan et al. ................................. 700/90 |
| 5,838,565 | 11/1998 | Hsieh et al. ........................... 700/100 |
| 5,946,212 | 8/1999 | Bermon et al. ........................ 700/96 |
| 5,946,661 | 8/1999 | Rothschild et al. ........................ 705/7 |
| 5,966,694 | 10/1999 | Rothschild et al. ........................ 705/7 |

FOREIGN PATENT DOCUMENTS

| | | |
|---|---|---|
| 9-336506/31 | 5/1997 | Japan . |
| 9-35665 | 11/1997 | Japan . |
| 98-455323/9 | 4/1998 | Taiwan . |
| WO9713211 | 4/1997 | WIPO . |

*Primary Examiner*—Paul P. Gordon
*Assistant Examiner*—Ramesh Patel
*Attorney, Agent, or Firm*—Michael Schwarz

[57] ABSTRACT

A method and computer system for controlling an industrial process are disclosed. The industrial process has problems which adversely effect its performance. A personal computer is programmed with a database and a custom application. The database contains data describing the attributes and performance of the process to be controlled. The custom application calculates the financial value of each of the problems. The calculation of the financial value of each problem takes into account the impact of each problem on the process bottleneck. The financial values of the problems are used to prioritize the problems, allowing them to be remedied in accordance with their priority.

20 Claims, 18 Drawing Sheets

METHOD AND COMPUTER SYSTEM FOR CONTROLLING AN INDUSTRIAL PROCESS BY ANALYSIS OF BOTTLENECKS

BACKGROUND

A typical industrial manufacturing plant involves a number of processes which produce products. Each process consists of a number of sub-processes. A primary goal of plant management is to operate the plant as efficiently (as close to optimum performance) as possible to give the lowest product cost. However, it is not unusual for a plant to operate less than optimally. This may happen for a variety of reasons. Difficulties may be caused by one or more problems in the process or sub-processes. For example, a power failure may stop all processes. A jam in a cap chute in a bottling plant may cause un-capped bottles which may require an extra operator to cap the bottles manually. In today's complex manufacturing plants, there may be thousands of separate problems which cause performance to deviate from optimum levels. Since resources for fixing such problems are not unlimited, management is often faced with difficult choices as to which problems to solve and the order in which they should be solved.

Using the technology of the prior art, it was possible to track the performance of an industrial process by means of the following:

1. calculating the efficiency of the process (i.e. the ratio of the actual output to the true potential output);
2. determining reasons for downtime (i.e. the identity and duration of the problems that stop the bottleneck);
3. determining labor variance (i.e. the difference between the actual direct labor cost and budgeted or planned direct labor cost);
4. determining raw material variance (i.e. the difference between the actual raw material consumption and budgeted or planned raw material consumption); and
5. determining the scrap level (i.e. the amount of product rejected during or upon completion of the manufacturing process).

Each of these approaches has deficiencies. In particular, none of the approaches of the prior art attempts to calculate the true financial cost of an individual problem nor the total cost of all problems affecting an industrial process. It is therefore impossible for plant management to allocate resources in an efficient manner if prior art approaches are employed.

The present invention addresses these and other numerous deficiencies of the prior art.

SUMMARY OF THE INVENTION

The present invention comprises a method and a computer system for controlling a process by determining the true financial cost of problems affecting the process, thus enabling the different problems to be prioritized and appropriate resources deployed for each problem. A typical process for producing a product is designed to run at an optimum performance. However, the process may have one or more problems which cause the process to run at less than the optimum performance, thereby causing the process to lose processing time or throughput.

The method of the invention comprises identifying a problem in the process and identifying a bottleneck in the process, such that the bottleneck dictates the maximum speed at which the process runs. A financial value of the problem is determined, taking into account the impact of the problem on the bottleneck. The problem can then be prioritized, a decision can be made whether to correct the problem or resources can be allocated to the problem based on the financial value of the problem.

Another aspect of the method of the invention is valuing the problem based on marginal profitability of the product, thus reflecting market conditions and allowing market conditions to be used in prioritizing the problem.

Another aspect of the method of the invention is determining how much processing time the process loses due to the problem. The step of calculating the financial value of the problem comprises the step of valuing the problem based on how much processing time the process loses due to the problem.

Yet another aspect of the method of the invention is determining how much processing time the process loses due to the problem causing the bottleneck to stop running, how much processing time the process loses due to the problem causing the bottleneck to run slower than expected and how much processing time the process loses due to the problem causing product to be scrapped at or after the bottleneck.

The computer system of the present invention includes means for inputting modeling data relating to the process, thereby building a computer model of the process and means for inputting performance data obtained by monitoring performance of the process. Means are provided for identifying a bottleneck in the process such that the bottleneck limits the maximum speed at which the process runs. The system also includes means for determining a financial value of problems in the process which include means for determining an amount of processing time the process loses due to a problem of the plurality of problems by taking into account the impact of the problems on the bottleneck.

Another aspect of the computer system is means for valuing problems based on marginal profitability of the product, thus reflecting market conditions and allowing market conditions to be used in prioritizing the problems.

Another aspect of the computer system is means for determining a slow running time for the problem, indicative of how much processing time the process loses due to the problem causing the bottleneck to run at a speed slower than an expected speed; means for determining a downtime for the problem, indicative of how much processing time the process loses due to the problem causing the bottleneck to stop running; and means for determining a bottleneck waste time for the problem, indicative of how much processing time the process loses due to the problem causing product to be scrapped at or after the bottleneck. Means are provided for valuing for the problem based on the amount of the processing time lost due to the problem.

These and other aspects of the invention will be apparent from the Detailed Description and claims.

DETAILED DESCRIPTION

The following is a detailed description of the invention. For ease of understanding, as aspects of the invention are described, reference is made to an example of a simple industrial process for packaging potatoes. The description and example are not intended to be limiting, the scope of the invention being determined by the claims.

A typical factory involves several shifts each day and several processes producing "variants" from raw materials. Each process may have sub-processes. A "variant" is a product or products whose characteristics are very similar.

Figure 1:
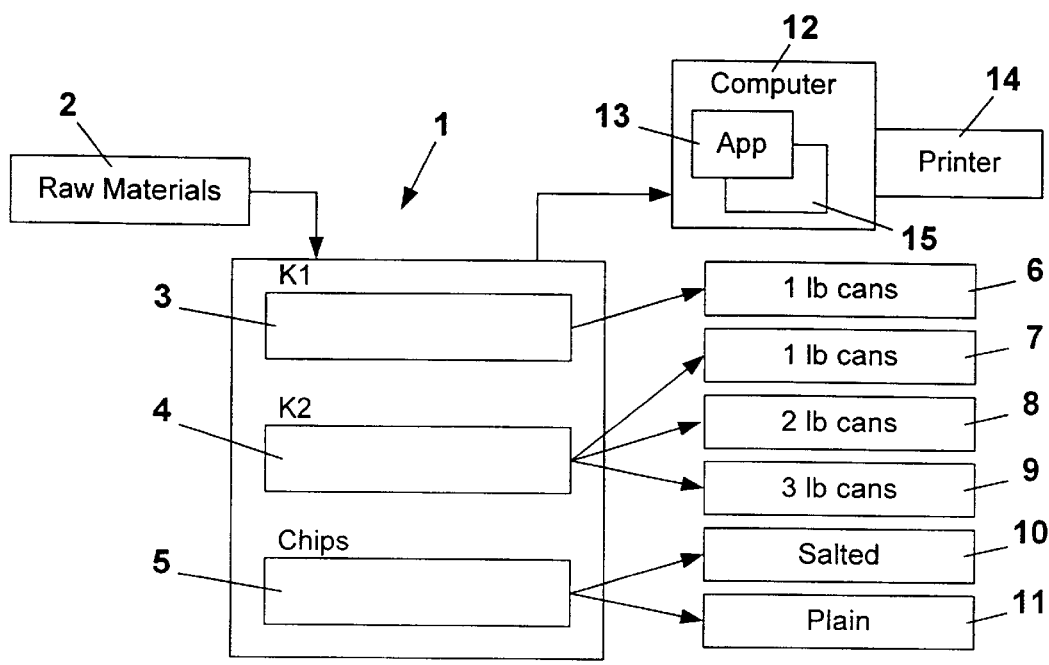
FIG. 1 is a block diagram showing the present invention applied to a simple potato processing and packaging plant.

In the potato processing and packaging example, broadly illustrated in FIG. 1, factory 1 receives raw materials 2 and processes them by means of processes (or lines) 3, 4 and 5 which produce variants 6, 7, 8 and 9—cases of 1, 2 and 3 lb cans of potatoes and variants 10 and 11—packets of salted and plain potato chips. Each variant has a number of different characteristics. These include the optimum crew size for operating the process, the maximum bottleneck speed of the process, the selling price of the variant, the unit marginal manufacturing cost of the variant and the names of various problem sets. A number of different problems may arise in a process. "Problem sets" are problems of different types which cause the characteristics of the process to deviate from their optimum or expected values. For example, the process may run too slowly ("slow running" problems), excess crew may be assigned to a process ("excess crew" problems), the process may stop working ("down time" problems), units may be scrapped at or after the bottleneck which wastes process time ("bottleneck waste" problems) and raw materials may be wasted ("raw material waste" problems).

The invention comprises a personal computer 12 programmed to model industrial process or factory 1 and perform certain calculations using custom application 13. Once the calculations have been performed, a problem priority list is printed out by printer 14 and is used to prioritize the adjustment of the parameters of factory 1.

Custom application 13 comprises specially written program code which interacts with a commercially available database 15, preferably Access®, available from Microsoft. Custom application 13 and database 15 preferably run in a Windows® 95 environment, but the precise operating system and database are not crucial to the invention. The custom application and its interactions with the database will be now be described in detail, it being understood that it is within the capabilities of a person of ordinary skill in the art to write the computer code needed to implement the invention.

Figure 2:
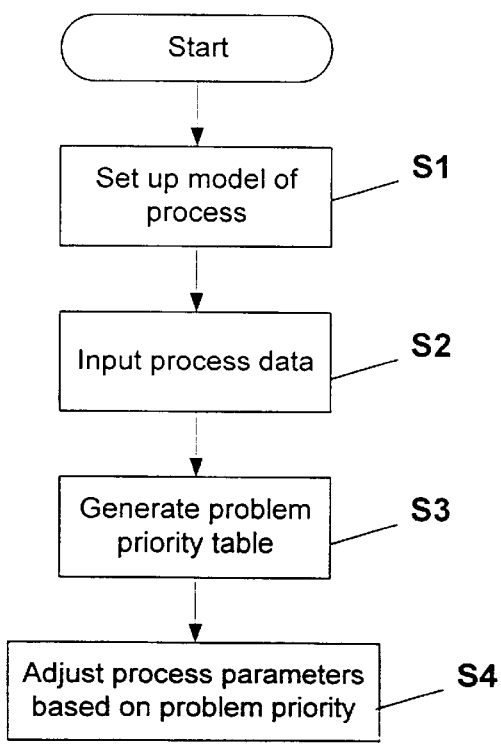
FIG. 2 is a flowchart showing the basic steps involved in the present invention.

The most basic steps of the method of the invention are shown in FIG. 2. First, the process or factory is modeled at S1. Next, process data is gathered and input into the database at S2. Financial values are calculated for the problems and, a problem priority table is generated at S3 based on those values. The parameters of the process are adjusted based on the problem priority table at S4. Each of these steps will now be described in detail.

Figure 3:
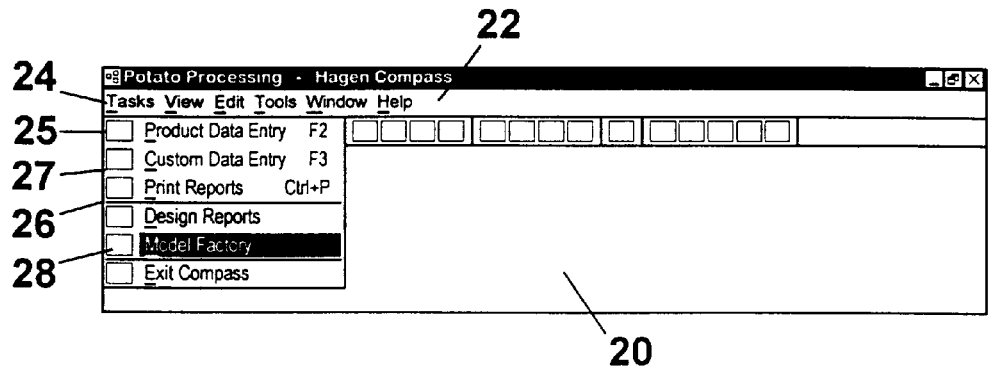
FIG. 3 is a snapshot of the main computer screen for the computer program of the present invention.
Figure 4:
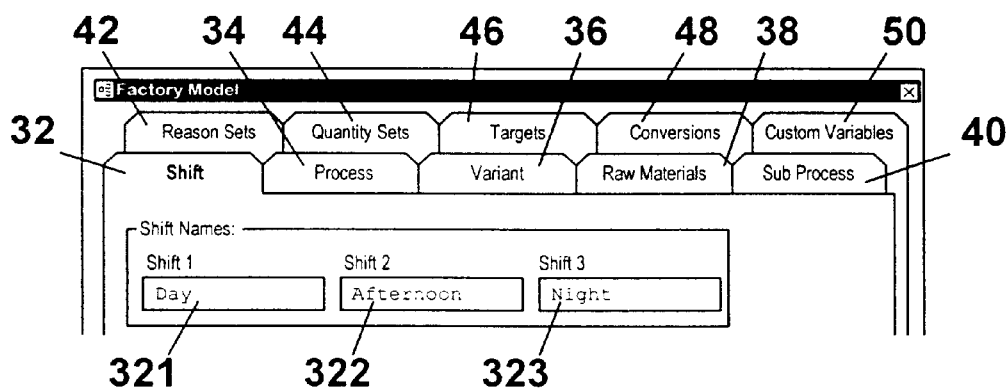
FIG. 4 is a snapshot of the computer screen used for entry of shift data for the modeling of the process to be controlled using the present invention.

1. MODELING THE FACTORY OR PROCESS:

In order to model the factory or process, data is entered into the computer via the main menu screen 20 of custom application 13 shown in FIG. 3. The user clicks the mouse or pointing device of computer 12 on the Tasks icon 24 in the menu bar 22, pulls down a menu 26 and clicks on the Model Factory icon 28. That takes him/her into the Factory Model screen 30 shown in FIG. 4. As shown in FIG. 4, the Factory Model screen is made up of a graphical representation of ten index cards, in a configuration commonly used in Windows 95 applications. Each of the index cards contains fields for entering data or drop down lists containing data already entered. These are used to build the model of the process or factory.

The index cards are as follows: Shift Card 32, Process Card 34, Variant Card 36, Raw Materials Card 38, Sub Process Card 40, Reason Sets Card 42, Quantity Sets Card 44, Targets Card 46, Custom Measures Card 48 and Custom Variables Card 50. Cards 32 to 44 will be described in detail. Cards 46, 48 and 50 have no application to the present invention.

Figure 5:
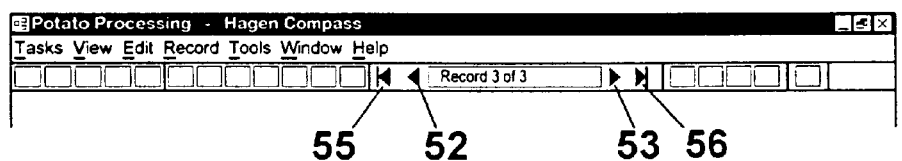
FIG. 5 is a snapshot of the navigation menu bar used for the entry of process, variant, sub-process and raw material data for the modeling of the process to be controlled using the present invention.
Figure 6:
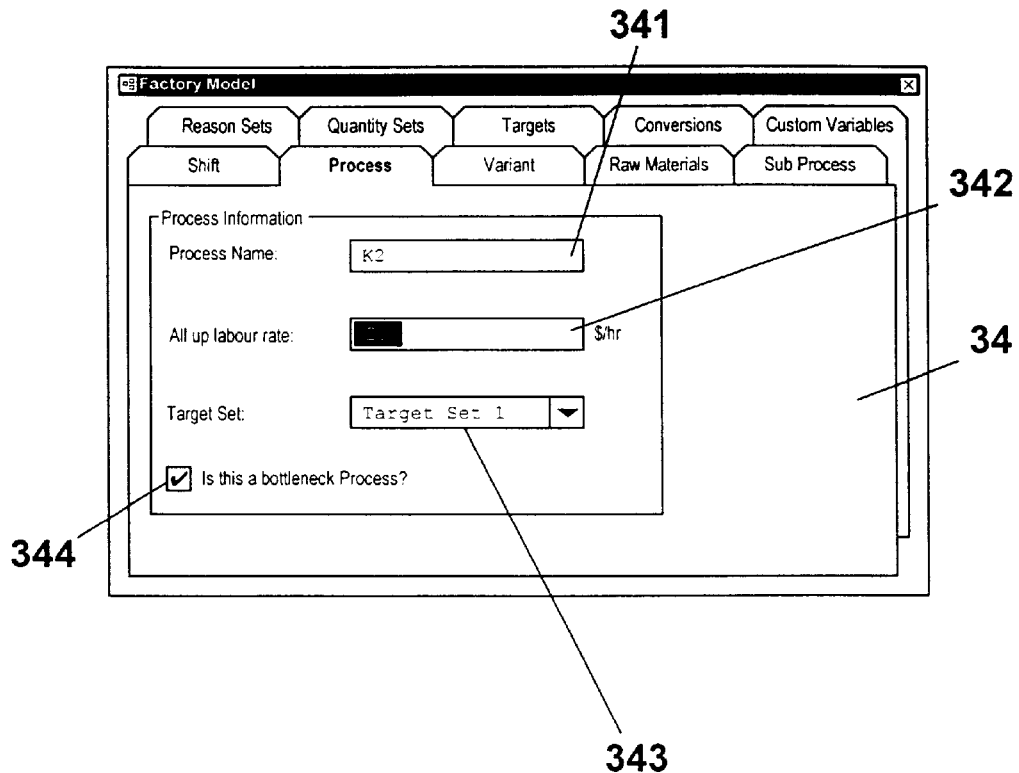
FIG. 6 is a snapshot of the computer screen used for entry of process data for the modeling of the process to be controlled using the present invention.

Each screen displaying Process Card 34, Variant Card 36, Raw Materials Card 38, Sub Process Card 40 has a number of records. The user can navigate through the records by means of the navigation menu bar 51 shown in FIG. 5. The navigation menu bar has the following buttons: MoveNext 53, which skips to the next record, MovePrevious 52, which skips back to the previous record, MoveFirst 55, which skips to the first record and MoveLast 56 which skips to the last record. The record number is displayed in field 54. New records are added by moving to the last record and pressing MoveNext. This gives a blank record. When the a record is filled or edited, the user presses MoveNext to save the information.

a. Shift Card:

Shift card 32 contains three fields 321, 322 and 323 which define the shifts operating in the factory. In the potato processing and packaging example illustrated in FIG. 4, there are three shifts: day, afternoon and night. The user simply enters the names of the shifts in the shift fields and then clicks on the next index card.

b. Process Card:

Process Card 34 shown in FIG. 6 permits entry of data for the various processes in the plant. It contains three fields: Process Name 341 which identifies each process, All Up Labor Rate ("AULR") 342 and Target Set 343. The All Up Labor Rate entered at field 342 is the total hourly cost of employing operators for a particular process. The Target Set drop down list 343 is not used for the present invention. The Process Card also allows the user to set a flag 344 which indicates whether a particular process is a bottleneck process, meaning that it is the limiting process in the factory. Flag 344 is not applicable to the present invention.

In the potato processing and packaging example, there are three processes, line K1 for putting potatoes into 1 lb cans, line K2 for putting potatoes into 1, 2 and 3 lb cans and the Chipping Line which produces salted and plain potato chips. The data entered for the various records stored in database 15 via the Process Card for the potato processing and packaging example are shown in the following table:

TABLE 1

Process Records

| Line: | K1 | K2 | Chipping Line |
| --- | --- | --- | --- |
| Process Name | K1 | K2 | Chipping Line |
| All Up Labor Rate | 20 | 20 | 22 |
| Target Set | N/A | N/A | N/A |
| Bottleneck Process? | Yes | Yes | Yes | c. Variants Card:

As stated above, a variant is a product or products whose characteristics are very similar. Each variant must be defined in order to model the factory. In our example, the variants are 1, 2 and 3 lb cans of potatoes and packets of potato chips. The characteristics of the variants of the process are entered at Variant Card 36 shown in FIG. 7. Each characteristic is entered into a specific field in Variant Card 36. The various fields and drop down lists are:

process name, for example, K1 for 1 lb cans of potatoes—drop down list 361.

variant name, for example, 1 lb cans—drop down list 362.

production units—for example cases of 1 lb cans—field 363.

maximum bottleneck speed of variant "v" ("$MBS_v$")—field 364—this is the maximum speed at which a process can run (i.e. the maximum speed of the slowest sub-process) and is measured in production units per hour. Each process has a bottleneck sub-process which dictates the maximum speed at which the process can run. This must be identified in each case.

optimum crew size to produce variant v ("$OCS_v$")—the optimum number of human operators needed for running a particular process to produce variant v—field 365.

unit marginal manufacturing cost for variant v ("$UMC_v$")—the cost of producing an additional production unit of the variant, including raw materials, packaging materials, additional energy costs, additional waste removal costs and additional distribution costs—field 366.

unit sales price of variant v ("$USP_v$")—the sales price per production unit—field 367.

production constrained additional volume of variant v ("$PC\%_v$")—the percentage of additional volume of the variant which could be sold, over and above the current level of production—field 368.

capital expenditure—field 369—not used in the present invention.

ABS conversion name—drop down list 370—not used in the present invention.

Output conversion name—drop down lists 371—not used in the present invention.

Reason Sets—the possible reasons for problems with the process—drop down lists 372, 373 and 374. The details of these will be described below.

Missed Plan Reason Set and Target Set—drop down lists 375 and 376 are not used in the present invention.

In the potato processing and packaging example, the data for each variant are shown in the following table:

TABLE 2

Variant Records

| Process Name: | K1 | K2 | K2 | K2 | Chipping Line | Chipping Line |
| --- | --- | --- | --- | --- | --- | --- |
| Variant Name: | 1 lb can | 1 lb can | 2 lb can | 3 lb can | plain | salted |
| Production Units: | cases | cases | cases | cases | pounds | pounds |
| MBS: | 100 | 100 | 600 | 400 | 3000 | 2000 |
| OCS: | 25 | 28 | 28 | 28 | 15 | 17 |
| UMC: | 2 | 2 | 5 | 7 | .55 | .6 |
| USP: | 5 | 5 | 9 | 12 | 2 | 2 |
| PC %: | 10 | 10 | 0 | 2 | 20 | 20 | d. Sub-Processes Card:

Each process can be broken down into sub-processes. A sub-process is a logical step or piece of equipment used in the process, typically a machine, for example, the canning machine for putting potatoes into cans or the salting barrel for salting the potato chips. While there may be a number of different sub-processes in a process, only those which are relevant need to be identified and included in the factory model. Relevant sub-processes include:

The Speed Bottleneck Sub-Process: This is the sub-process with the lowest maximum speed and hence the speed-limiting sub-process. This sub-process must be modeled.

The Output Bottleneck Sub-Process: This is the sub-process which limits the output of the process for the majority of the time. It may be the same as the Speed Bottleneck Sub-Process. The Output Bottleneck Sub-Process is the sub-process with the lowest product of maximum bottleneck speed and percentage up time. Modeling this process is optional.

Near Bottleneck Sub-Processes: These are processes which are close to being the output bottleneck or often are. Modeling these processes is optional.

Reverting to the potato packing process, the speed bottleneck sub-process for the 1 lb can process K1 is the can filler. It is also the output bottleneck. The same is found to be case for the 2 lb process, K2. In the chipping line, the speed bottleneck is the fryer for plain chips and the salting barrel for salted chips. For the sake of simplicity, in this example, it will be assumed that there are no other sub-processes.

Figure 8:
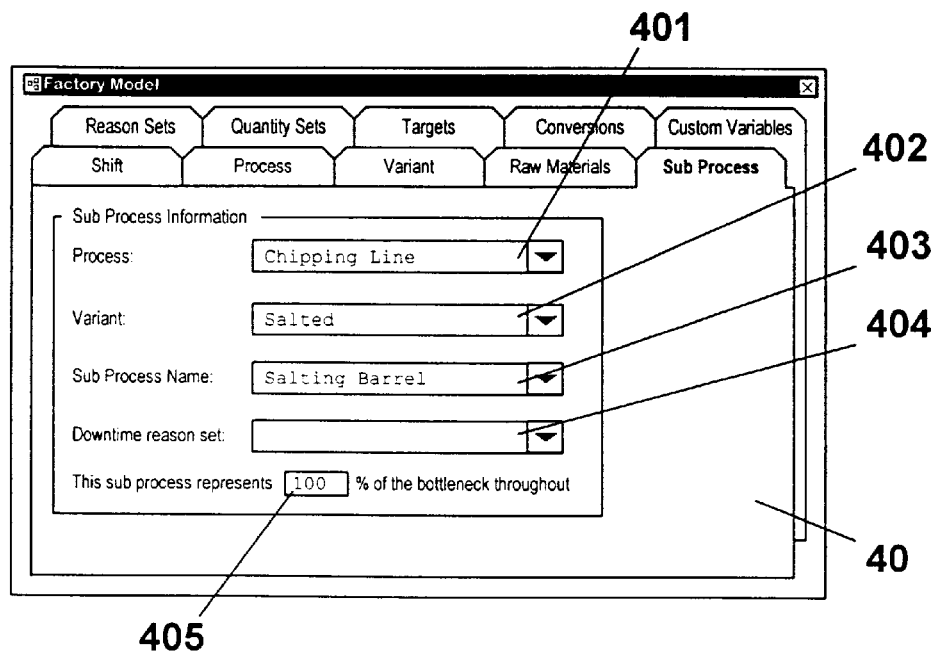
FIG. 8 is a snapshot of the computer screen used for entry of sub-process data for the modeling of the process to be controlled using the present invention.

Modeling each process includes entering relevant sub-process information at Sub-Process Card 40 shown in FIG. 8. The user selects the process (e.g. the chipping line) by means of drop down list 401, and the variant made by that process (e.g salted chips) by means of drop down field 402. The sub-process (e.g. the salting barrel—the speed bottleneck sub-process in this case) is entered at drop down list 403 or can be selected from a list of sub-process names. The downtime reason set name is displayed in drop down list 404, which contains a list of the reason sets (reasons for down time at the particular sub-process entered as described in the text relating to FIG. 10). The Percentage of Bottleneck is entered at field 405. This is the percentage of throughput through the particular bottleneck sub-process. For example, if two parallel can fillers formed a bottleneck, each filler would account for a proportion of the bottleneck. In the example illustrated in FIG. 8, the salting barrel sub-process represents 100% of the bottleneck throughput.

The data for the speed bottleneck sub-process for each of the processes K1, K2 and the chipping processes are shown the following table:

TABLE 3

Sub-Process Records

Figure 7:
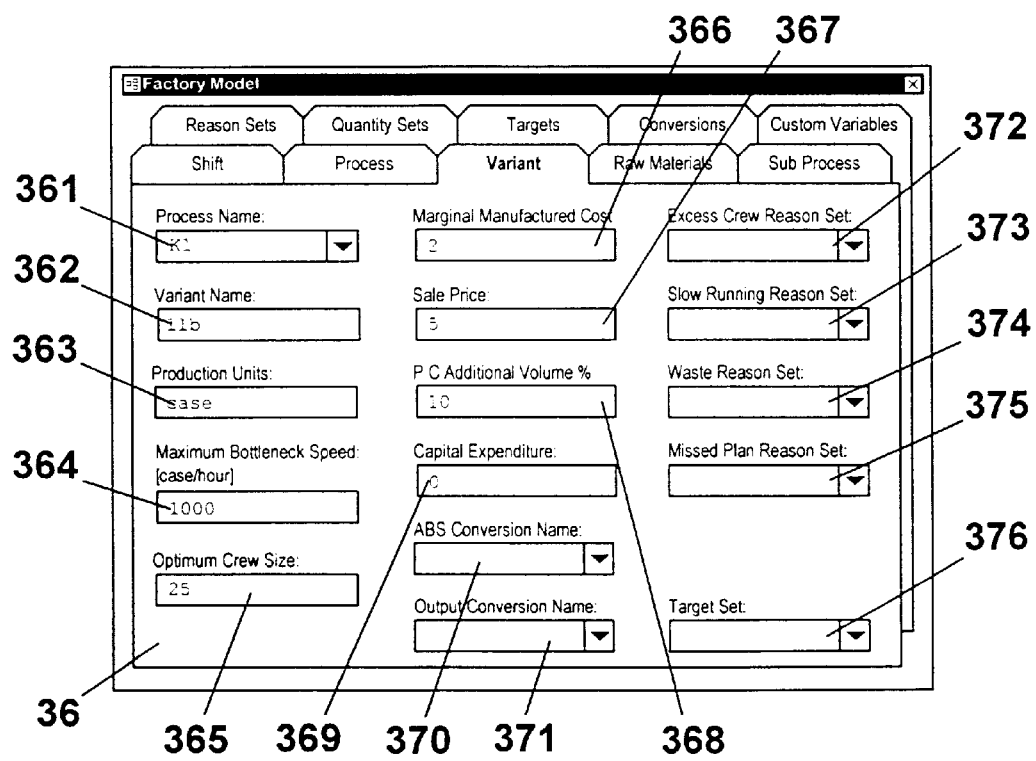
FIG. 7 is a snapshot of the computer screen used for entry of variant data for the modeling of the process to be controlled using the present invention.
Figure 9:
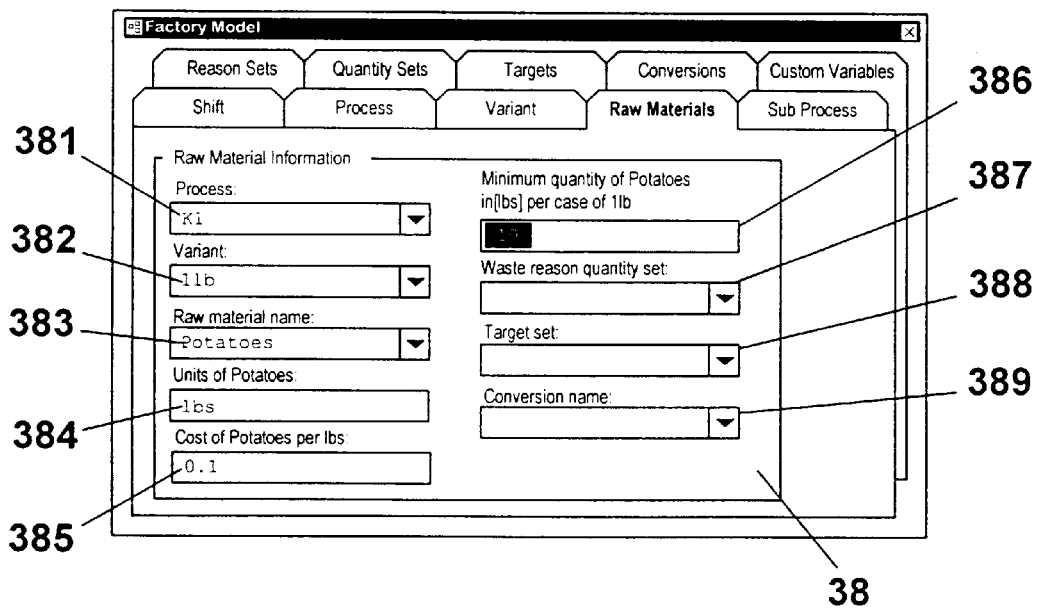
FIG. 9 is a snapshot of the computer screen used for entry of raw materials data for the modeling of the process to be controlled using the present invention.
Figure 13:
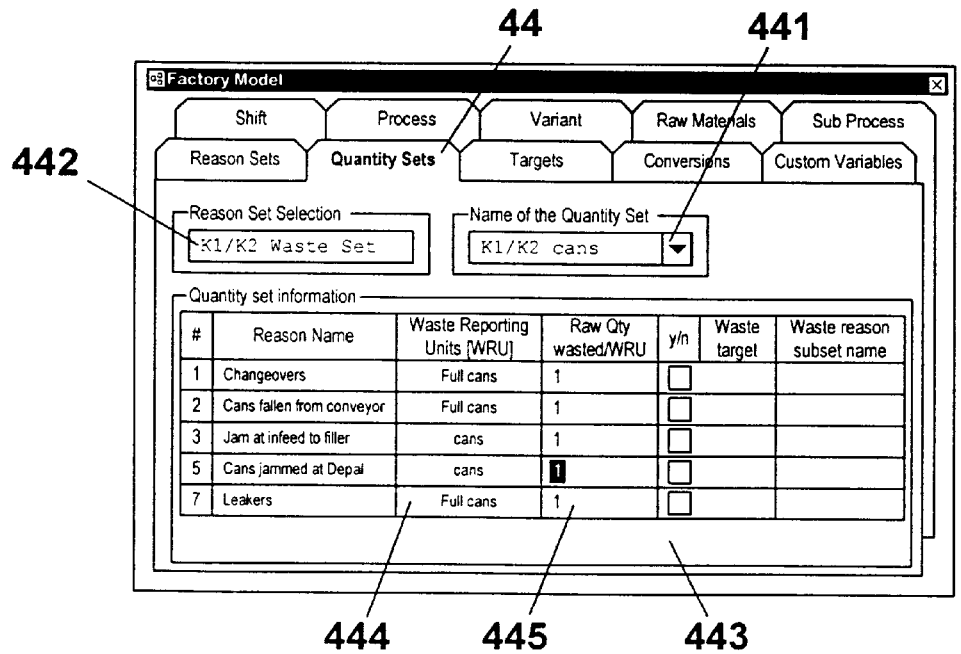
FIG. 13 is a snapshot of the computer screen used for the entry of quantity sets.

| Process Name: | K1 | K2 | K2 | K2 | Chipping Line | Chipping Line |
|---|---|---|---|---|---|---|
| Variant | 1 lb can | 1 lb can | 2 lb can | 3 lb can | plain | salted |
| Sub-Process Name: | K1 Filler | K2 Filler | K2 Filler | K2 Filler | plain fryer | salting barrel |
| % of Bottleneck: | 100 | 100 | 100 | 100 | 100 | 100 | e. Raw Materials Card:

Data relevant to the value of raw materials is entered into the model at Raw Materials Card 38 shown in FIG. 9. For each variant, there is at least one raw material. Raw materials are defined in terms of:

the process name—drop down list 381—containing the names of all the processes (see FIG. 6).

the variant name—drop down list 382—containing the names of all the defined variants (see FIG. 7).

the raw material name—drop down list 383, allowing direct entry or selection from previously defined raw material names.

the units of raw material—drop down list 384—containing the names of all reason quantity sets (see FIG. 13).

the per unit cost of raw material ($RW\$_r$)—field 385.

the minimum raw material content—field 386—this is the minimum quantity of raw material required to produce one production unit of the variant, assuming no waste loss.

The target set—drop down list 388—and conversion name—drop down list 389—are not pertinent to the present invention.

The data for the raw materials used in processes K1, K2 and the chipping lines are shown in the following table:

TABLE 4

Raw Material Records

| Process Name | Variant Name | Raw Material Name | Raw Units | Raw Cost | Minimum Raw Material Content |
|---|---|---|---|---|---|
| K1 | 1 lb cans | potatoes | lbs | 0.1 | 10 |
| K1 | 1 lb cans | cans | cans | 0.05 | 10 |
| K2 | 1 lb cans | potatoes | lbs | 0.1 | 10 |
| K2 | 1 lb cans | cans | cans | 0.05 | |
| K2 | 2 lb cans | potatoes | lbs | 0.1 | 20 |
| K2 | 2 lb cans | cans | cans | 0.1 | 10 |
| K2 | 3 lb cans | potatoes | lbs | 0.1 | 30 |
| K2 | 3 lb | cans | cans | 0.15 | 10 |
| Chipping Line | plain | potatoes | lbs | 0.1 | 3 |
| Chipping Line | plain | bags | bags | 0.02 | 1 |
| Chipping Line | salted | potatoes | lbs | 0.1 | 3 |
| Chipping Line | salted | bags | bags | 0.02 | 1 | f. Reason Sets Card:

A "Reason Set" is a group of reasons for different problems in the factory or process (excess crew problems, downtime problems, slow running problems, bottleneck waste problems and raw material waste problems). Reason sets are defined by inputting information at the Reason Sets Index Card 42 shown in FIG. 10. Each reason set has a name shown in drop down list 421. The reason set is entered into drop down list 421. Each Reason Set consists of one or more reasons for a particular problem. In the illustrated example, the K1/K2 Downtime set comprises changeovers, cans jammed at the depalletizer, jams at the infeed to the filler etc. as shown in table entered at table 422. These are entered, one reason definition per line. The columns 423 are the characteristics of each reason. When the operator clicks on a particular reason set in the pull down menu at 421, the table of reasons in that reason set and the corresponding characteristics columns appear. The relevant characteristic data can then be entered. The properties of the illustrated reason set are:

Reason Code—column 424—this is a number indicating the order of a particular reason within the reason set.

Figure 10:
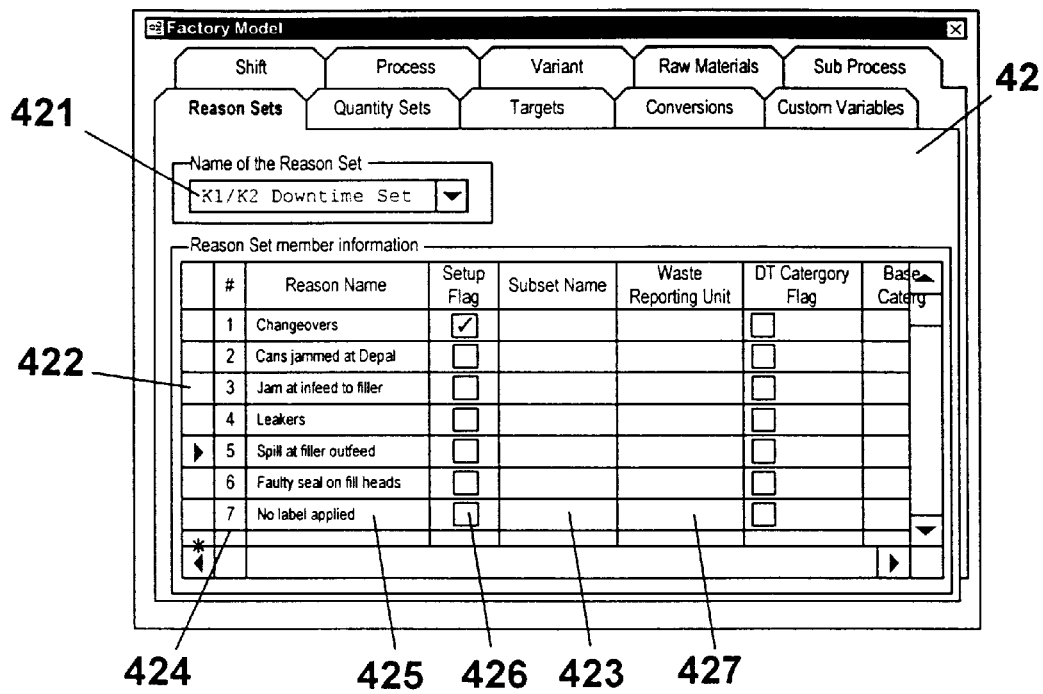
FIG. 10 is a snapshot of the computer screen used for entry of reason sets for the modeling of the process to be controlled using the present invention.
Figure 10:
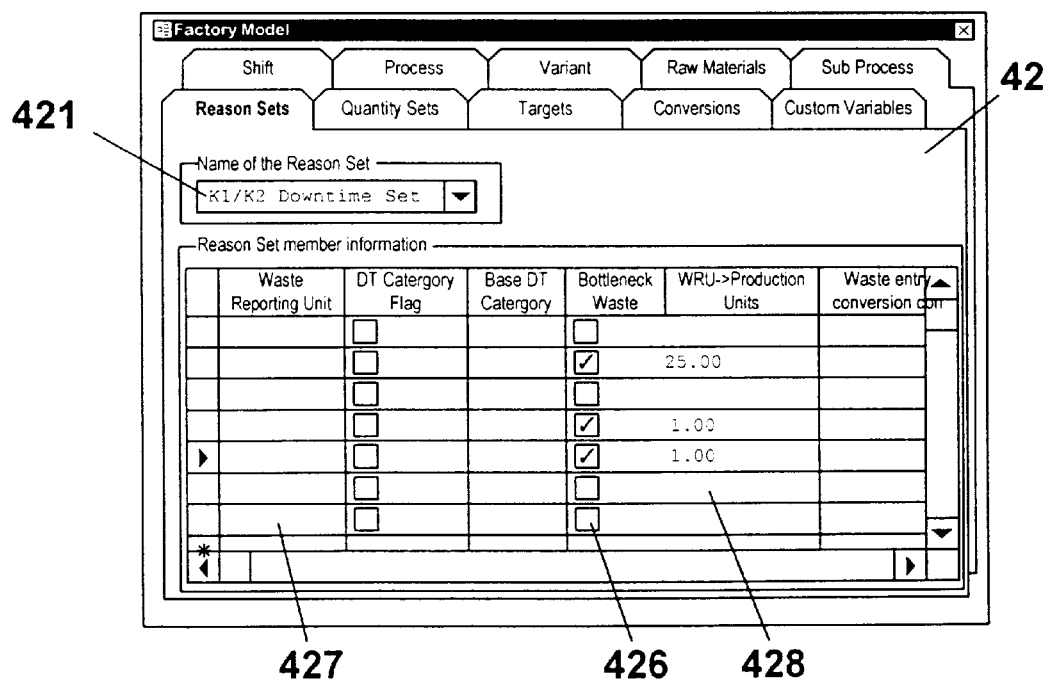

Reason Name—column 425—this is a descriptive title for a reason in the reason set, for example, the reason set shown in FIG. 10 includes a reason name "changeovers." This indicates that a problem is caused by changeovers between variants.

Bottleneck Waste Flag—column 426—this is a flag which signifies that a particular reason in the reason set acts as a bottleneck waste reason, in addition to any other type of reason that it might be.

Waste Reporting Unit ("$WRU_{pv}$")—column 427—these are the units of waste in which the particular reason will be reported, for example, kilograms of raw potatoes, cans, or cases.

Waste Reporting Units to Production Units ("WRUtoPU$_{pv}$")—field 428—this is the numerical conversion factor to convert the waste reporting units to production units.

Note that the following fields and flags shown in Index Card 42 are inapplicable to the present invention: Setup flag, subset name, DT category flag, Base DT category, Waste Entry Conversion Code, DT target, SR target, XC target and BW target.

Four reason sets are defined in the example which has been used to illustrate the modeling of the factory. The data entered into the Reason Set Card for the potato processing and packaging plant are tabulated in Tables 6, 7, 8 and 9 for K1/K2 waste, K1/K2 slow running, K1/K2 downtime and K1/K2 excess crew respectively.

TABLE 6

K1/K2 Waste Reason Set

| Reason Code | Reason Name | Bottleneck Waste Flag | Waste Reporting Unit | Waste Reporting Unit to Production Units |
|---|---|---|---|---|
| 1 | changeovers | true | full cans | 0.1 (i.e. 10 cans per case) |
| 2 | cans falling from conveyor | true | full cans | 0.1 |
| 3 | jams at infeed to filler | false | cans | |
| 4 | cans jammed at depalletizer | false | cans | |
| 5 | leakage | true | filIl cans | 0.1 |

TABLE 7

Slow Running Reason Set

| Reason Code | Reason Name | Bottleneck Waste Flag | Waste Reporting Unit | Waste Reporting Unit to Production Units |
|---|---|---|---|---|
| 1 | underfills | false | | |
| 2 | faulty seal on fill heads | false | | |
| 3 | leakage | false | | |
| 4 | operator choice | false | | |
| 5 | wrong setting after changeover | false | | |

TABLE 8

K1/K2 Downtime Reason Set

| Reason Code | Reason Name | Bottleneck Waste Flag | Waste Reporting Unit | Waste Reporting Unit to Production Units |
|---|---|---|---|---|
| 1 | changeovers | false | | |
| 2 | cans jammed at depalletizer | false | | |
| 3 | jams at infeed to filler | false | | |
| 4 | leakers | false | | |
| 5 | spill at filler outfeed | false | | |
| 6 | faulty seal on filler | false | | |

TABLE 9

K1/K2 Excess Crew Reason Set

Figure 11:
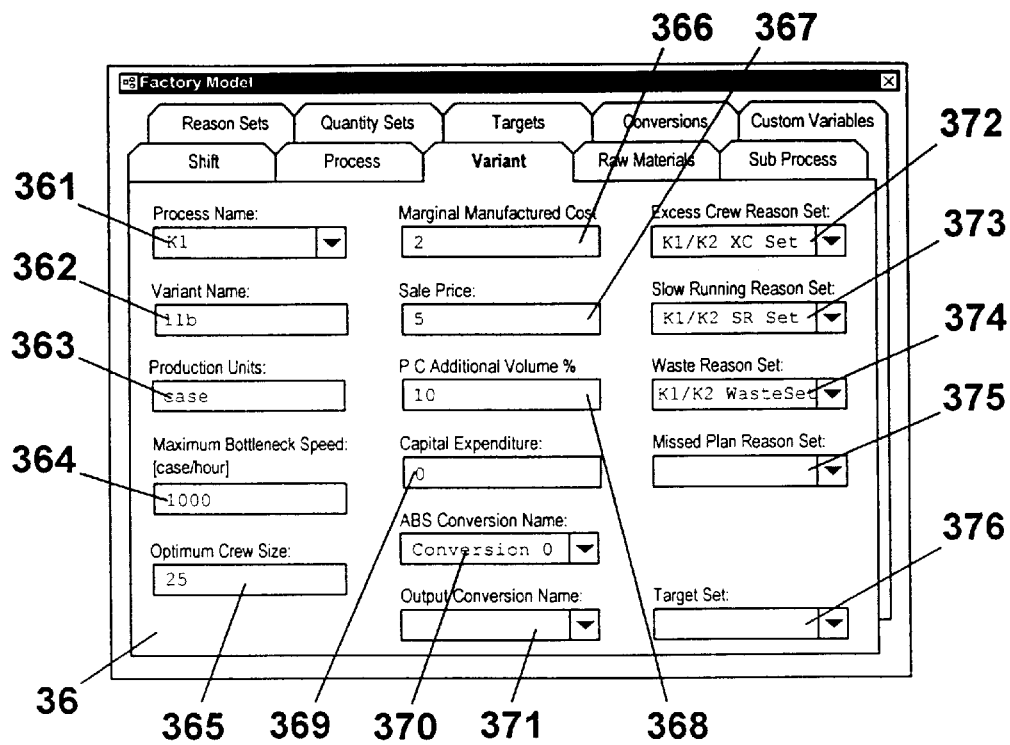
FIG. 11 is a snapshot of the computer screen used for attaching reason sets to variants.
Figure 12:
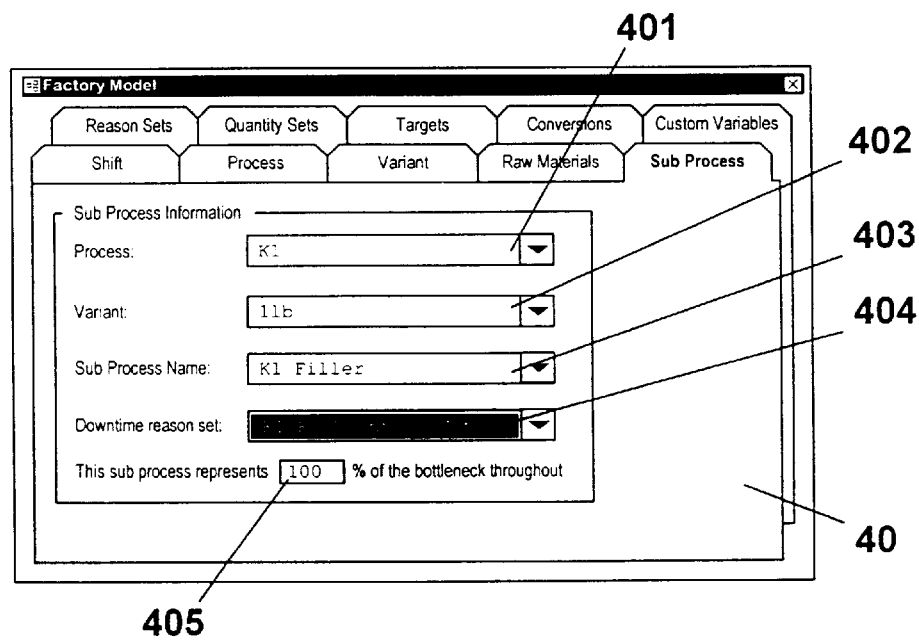
FIG. 12 is a snapshot of the computer screen used for attaching reason sets to sub-processes.

| Reason Code | Reason Name | Bottleneck Waste Flag | Waste Reporting Unit | Waste Reporting Unit to Production Units |
|---|---|---|---|---|
| 1 | no label applied | false | | |
| 2 | leakage | false | | |
| 3 | too many temps booked | false | | |
| 4 | forced product changeover | false | | | g. Attaching Reason Sets:

Having entered the data defining the various reason sets, the reason sets can be attached to the variants and subprocesses. It will be recalled that when Variants Index Card 36 was described (see FIG. 7), the Reason Set fields were not discussed. The Reason Sets fields in FIG. 7 (i.e. Excess Crew 372, Slow Running 373, Bottleneck Waste 374 and Raw Material Waste 376) are pull down menus which allow the user to select a known Reason Set entered at the Reasons Sets Card. The attachment of Reason Sets to variants is illustrated in FIG. 11. There are similar reason sets for the sub-processes which are similarly attached by means of the sub-process screen as shown in FIG. 12.

h. Quantity Sets:

Waste is typically reported in terms of units of finished or partially finished product (e.g. cans of potatoes or cases of cans). It is therefore necessary to provide a conversion factor "WRUtoRU$_{pvsd}$" between waste reporting units ("WRU$_{pv}$") and raw material wasted ("WasteQty$_{pvsd}$"). The definition of Reason Quantity Sets provides this conversion factor.

A reason quantity set must be defined between each reason set which is to be used for raw material waste problems and each raw material. In the case of the potato processing and packaging plant, there are two raw materials for each production variant. A reason quantity set will be required for each raw material for each variant, unless the data are identical.

The user clicks on the Quantity Sets index card 44. Refer now to FIG. 13. Drop down list 441 contains the names of all the reason sets already defined (see FIG. 10). The name of the quantity set is entered at field 442. Table 443 is made up of each reason in the reason set which is specified in field 441. The waste reporting unit (column 444) comes from the definition set up in FIG. 10 (column 427). The only data entered is WRUtoRU$_{pvsd}$, entered in column 445.

Four Waste Reason Quantity Sets are required for the K1 and K2 lines of the potato processing and packaging plant described. One for cans (i.e. one for 2 lb and one for 3 lb cans) and two are for potatoes. These are shown in Tables 10, 11 and 12.

TABLE 10

K1/K2 Cans Reason Quantity Set

| Reason Code | Reason Name | Waste Reporting Unit | Waste Reporting Unit to Raw Material Units |
|---|---|---|---|
| 1 | changeovers | full cans | 1 |
| 2 | cans fallen from conveyor | full cans | 1 |
| 3 | jams at infeed to filler | cans | 1 |
| 4 | cans jammed at depalletizer | cans | 1 |
| 5 | leakage | full cans | 1 |

TABLE 11

K1/K2 2 lb Potatoes Reason Quantity Set

| Reason Code | Reason Name | Waste Reporting Unit | Waste Reporting Unit to Raw Material Units |
|---|---|---|---|
| 1 | changeovers | full cans | 2 |
| 2 | cans fallen from conveyor | full cans | 2 |
| 3 | jams at infeed to filler | cans | 2 |
| 4 | cans jammed at depalletizer | cans | 2 |
| 5 | leakage | full cans | 2 |

TABLE 12

K1/K2 Cans Reason Quantity Set

Figure 14:
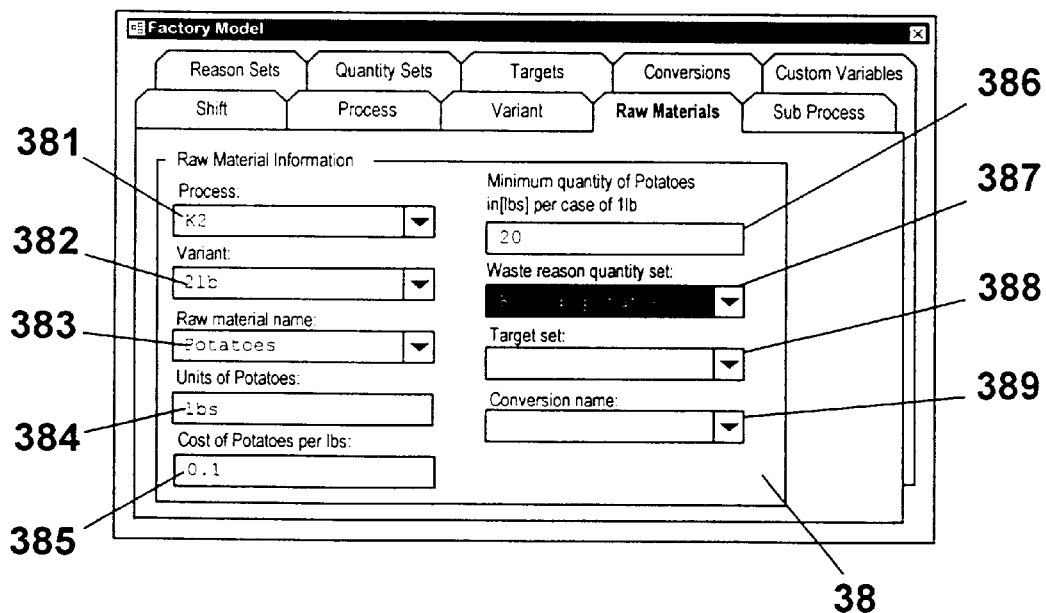
FIG. 14 is a snapshot of the computer screen used for attaching reason sets to the quantity sets.

| Reason Code | Reason Name | Waste Reporting Unit | Waste Reporting Unit to Raw Material Units |
|---|---|---|---|
| 1 | changeovers | full cans | 3 |
| 2 | cans fallen from conveyor | full cans | 3 |
| 3 | jams at infeed to filler | cans | 3 |
| 4 | cans jammed at depalletizer | cans | 3 |
| 5 | leakage | full cans | 3 | i. Attaching Reason Quantity Sets to the Factory Model:

Refer to FIG. 14. The raw materials card 38 is used to attach the reason quantity sets entered at the quantity sets screen, just described, to the model. The waste reason quantity set is selected using drop down list 387 and attached by means of the navigation menu bar.

2. INPUT OF PROCESS DATA:

Having created a model of the process or factory, the next step is the entry of data relating to the actual performance of the process or factory. For each production run, factory personnel will enter the data for each variant. There are four categories of data: (1) production data; (2) downtime data; (3) yield data and (4) waste data.

Figure 15:
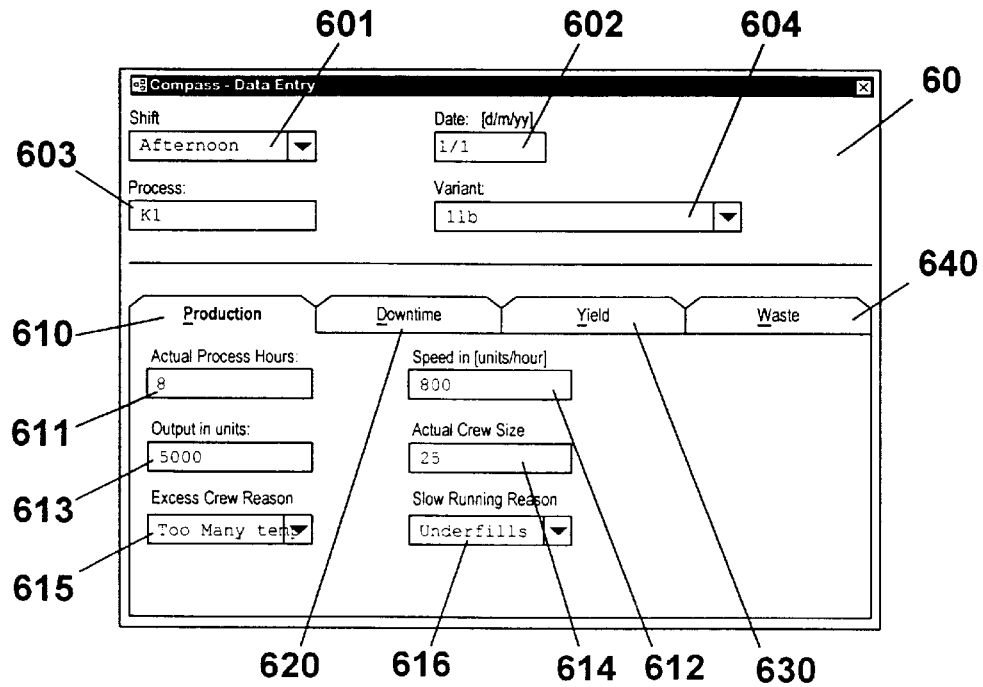
FIG. 15 is a snapshot of the computer screen used for selecting process, shift, date and variant and also for entry of production data.

On the main screen 20, the operator clicks the pointing device on Task 24 in the menu bar 22, pulling down the task menu 26. See FIG. 3. He/she then clicks on the Production Data Entry icon 25. This brings up the Data Entry screen 60 shown in FIG. 15. The operator then selects the shift (e.g. afternoon) in drop down list 601, enters the date (e.g. 1/1) in field 602, selects the process (e.g. the K1 line) in drop down list 603 and the variant (e.g. 1 lb cans) in drop down list 604. For each of the categories of data (1) production data; (2) downtime data; (3) yield data and (4) waste data, there is a corresponding index card 610, 620, 630 and 640 respectively.

Clicking on the Production Index Card 610 (see FIG. 15) allows the operator to enter production data. In each case, the operator will enter the actual number of hours the process was crewed for the relevant shift ("$APH_{vsd}$") (e.g. 8 hours) in field 611, the speed of the process—the actual bottleneck speed in units per hour ("$ABS_{vsd}$")(e.g. 800) in field 612, the output in units ("$O_{vsd}$")(e.g. 5,000) in field 613 and the actual crew size ("$ACS_{vsd}$")(e.g. 25) in field 614. The operator then uses the drop down lists 615 and 616 to choose a reason for excess crew and a reason for slow running. See FIG. 7, fields 372 and 373.

Figure 16:
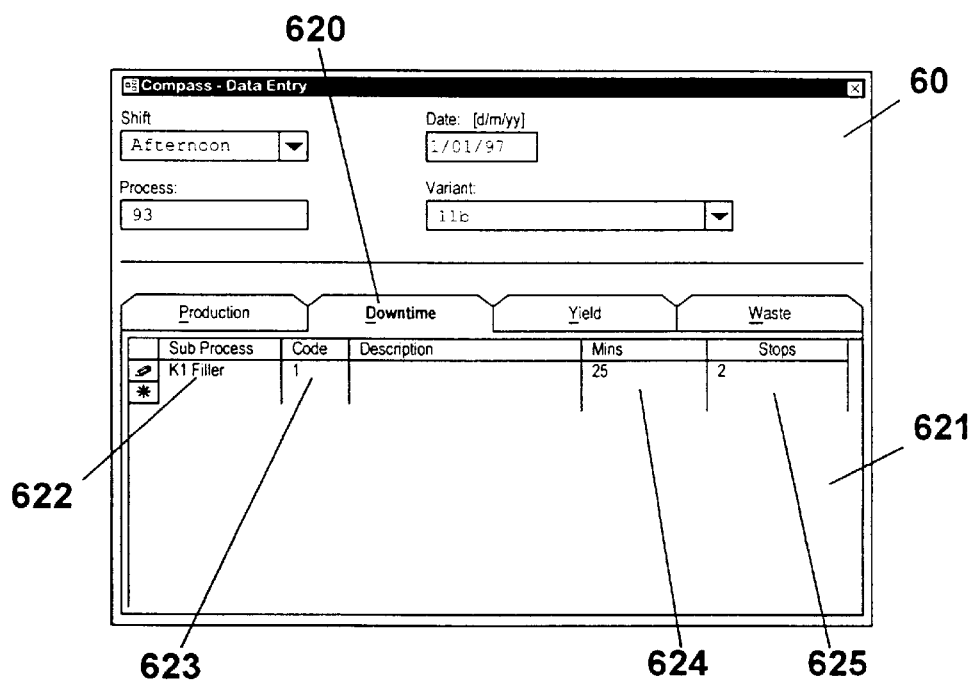
FIG. 16 is a snapshot of the computer screen used for entry of downtime data.

Referring to FIG. 16, the operator clicks on Downtime Index Card 620 to enter data relating to downtime and number of stops in a particular production run by variant. For the same shift, date, process, and variant just selected, a number of downtime entries can be entered. Downtime Index Card 620 includes table 621 for that purpose. Table 621 has a sub-process drop down list 622 which allows selection of a sub-processes from the set of sub-processes defined in the sub-processes screen 40 (See FIG. 8), for the selected process and variant. The appropriate reason set for the sub-process is then made available for the set of downtime reasons. The user then selects a reason code from drop down list 623 (entered at the Reasons Sets screen 42)(See FIG. 10) and attached to the particular sub-process in the sub-process screen 40 (See FIG. 12). Having selected a sub-process and a reason code, the operator can now enter the downtime ("$DT_{pvsd}$") and the number of stops in fields 624 and 625 respectively. This is repeated for all downtime which has occurred on all sub-processes on the selected shift for the selected variant.

Figure 17:
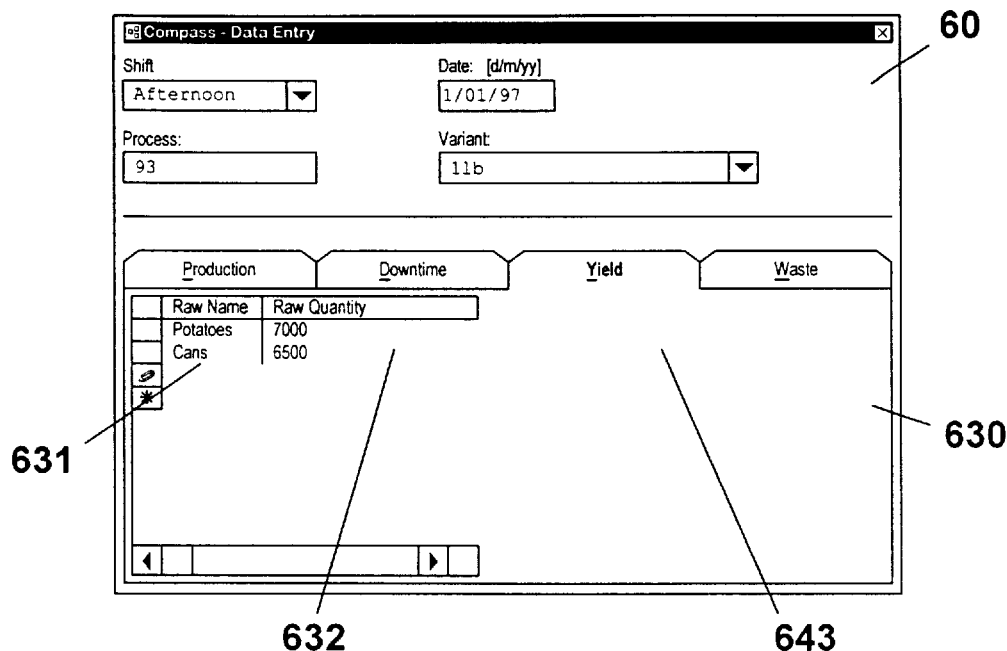
FIG. 17 is a snapshot of the computer screen used for entry of yield data.

FIG. 17 shows the Yield Index Card 630. Clicking on this card allows entry of the quantity of raw materials which were used for the selected process. For the same shift, date, process, and variant just selected, a defined raw material ("raw name") for a particular variant can be selected by clicking on the drop down list 632 in table 630. This list contains all the raw materials for the selected variant. This was defined in the Raw Materials screen (see FIG. 9). The quantity of each raw material ("$RI_{vsd}$") used in the production run of the selected variant on the selected shift is entered in column 632.

Figure 18:
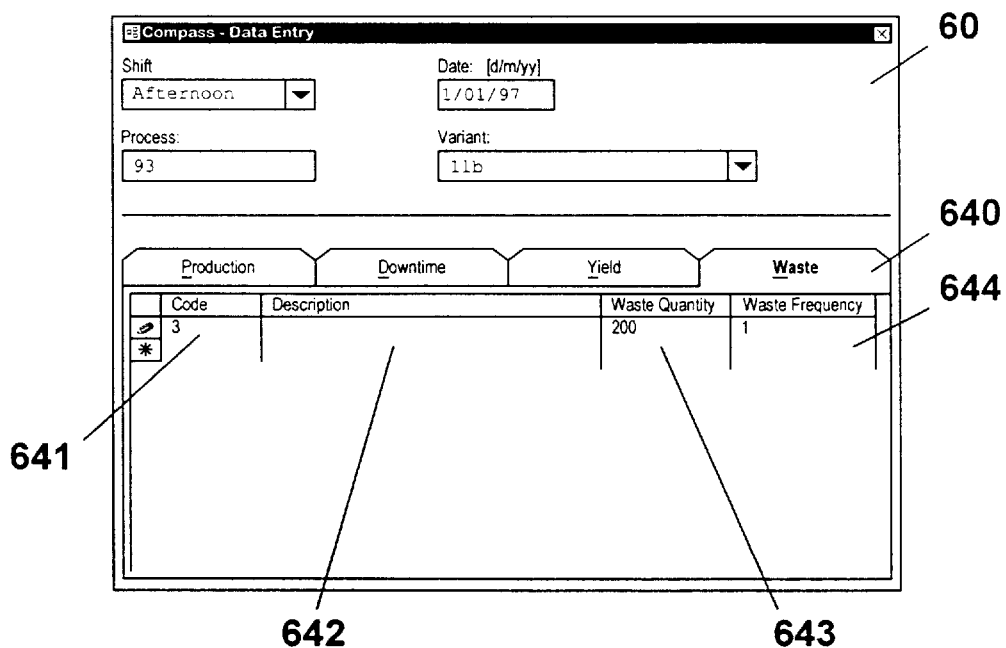
FIG. 18 is a snapshot of the computer screen used for entry of waste data.

FIG. 18 shows the Waste Data Index Card 640. Clicking on is card allows the entry of data for raw material waste and bottleneck waste. For the same shift, date, process, and variant just selected, a waste reason set is selected (see FIG. 7, field 374) by clicking on the code drop down list 64, which lists all defined codes previously entered (see FIG. 10). Once the reason code has been selected, the waste reason description is automatically loaded. See column 642. The quantity of raw material wasted ("$WasteQty_{pvsd}$") is entered in column 643 and the frequency of waste is entered in column 644. This is repeated for all raw material and waste problems that occurred during production of the variant on the particular day and shift.

3. GENERATING THE PROBLEM PRIORITY TABLE FOR PROBLEMS IN A PROCESS:

The factory or process has now been modeled and the relevant performance data have been entered. The operator now clicks on the print reports icon 27 in main screen 20 (see FIG. 3). This starts the calculation of the "Problem Priority Table" and its printing.

Figure 19:
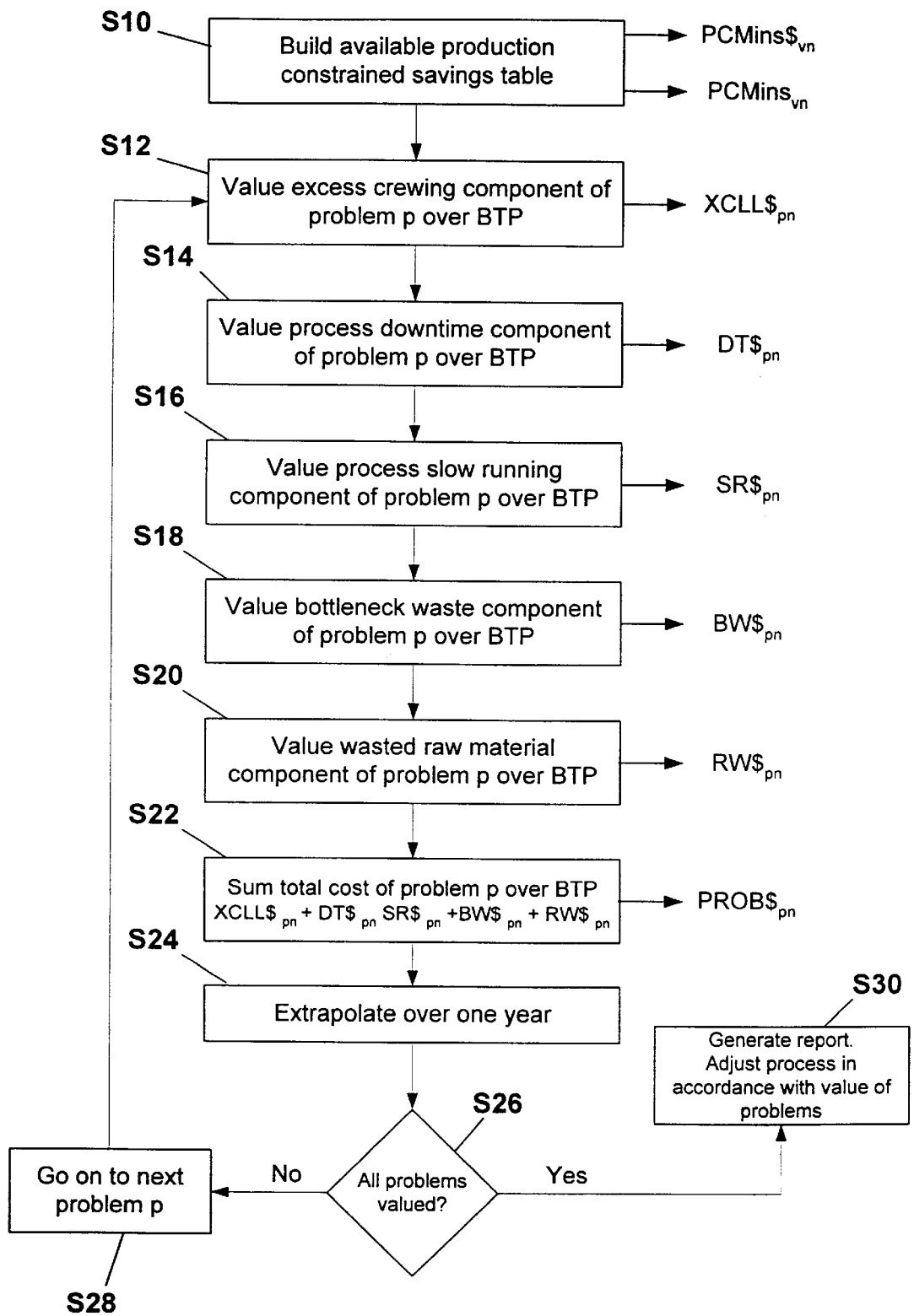
FIG. 19 is a flow diagram showing the basic steps in the valuation of problems and the control of a process in accordance with the value of problems.

The following is a detailed description of the calculation of the problem priority table. Referring to FIG. 19, there are ten basic steps in the development of the problem priority table, namely:

1. Building the "Available Production Constrained Savings Table." Step S10
2. Valuing the excess crewing component of a problem p over the base table period, BTP ($XCLL\$_{pn}$). Step S12. The base table period is typically five weeks.
3. Valuing the process downtime component of a problem p over the BTP ($DT\$_{pn}$). Step S14.
4. Valuing the process slow running time component of a problem p over the BTP ($SR\$_{pn}$). Step S16.
5. Valuing the process time lost due to bottleneck waste (the product rejected at or after the bottleneck sub-process) component of a problem p over the BTP ($BW\$_{pn}$). Step S18.
6. Valuing the wasted raw material component of a problem p over the BTP ($RW\$_{pn}$). Step S20.
7. Summing the total value of problem p over the BTP. Step S22.

8. Extrapolating the cost of problem p over a one year period. Step S24
9. Repeating steps 1 to 8 for all problems occurring in the process over the BTP. Steps S26 and S28.
10. Sorting by total value all problems to generate the problem priority report, printing out the report and adjusting the process in accordance with the value of the problems. Step S30.

Each of these steps will now be described in detail.
1. Building the "Available Production Constrained Savings Table."

If the process is not operating at 100% efficiency, bringing it to 100% efficiency will allow additional units of the variant to be made. If those units can be sold (i.e. the process is "production constrained") then additional profits will be derived. If those units cannot be sold (i.e. the process is sales constrained), then improving the efficiency of the process will result in production of the same number of units in less time, thus reducing the labor costs.

The Available Production Constrained Savings Table analyzes the process in terms of time units of 100% efficient operation, i.e. minutes during which the process is performing as expected over a base table period ("BTP"). The base table period is preferably 5 weeks. Once that is done, each problem can be valued in terms of how many of such units it wastes, in addition to how much raw material and labor time it wastes.

As a first step, the number of units of 100% efficient operation (or "optimum process time") available, $PCM_n$, for the process over the BTP and the monetary value of those units, $PCM\$_n$, are calculated. The Available Production Constrained Savings Table, stored in database 15, identifies each variant for which additional volume could be sold over the BTP (i.e. each production constrained variant), the quantity of optimum process time required to produce the additional volume, $PCMins_{vn}$, and the value of each minute of that process time, $PCMins\$_{vn}$. These values will be used in later steps in order to value the portion of the problem relating to the cost of lost production, i.e. the lost profit that could have been generated from the sale of additional units.

Figure 20:
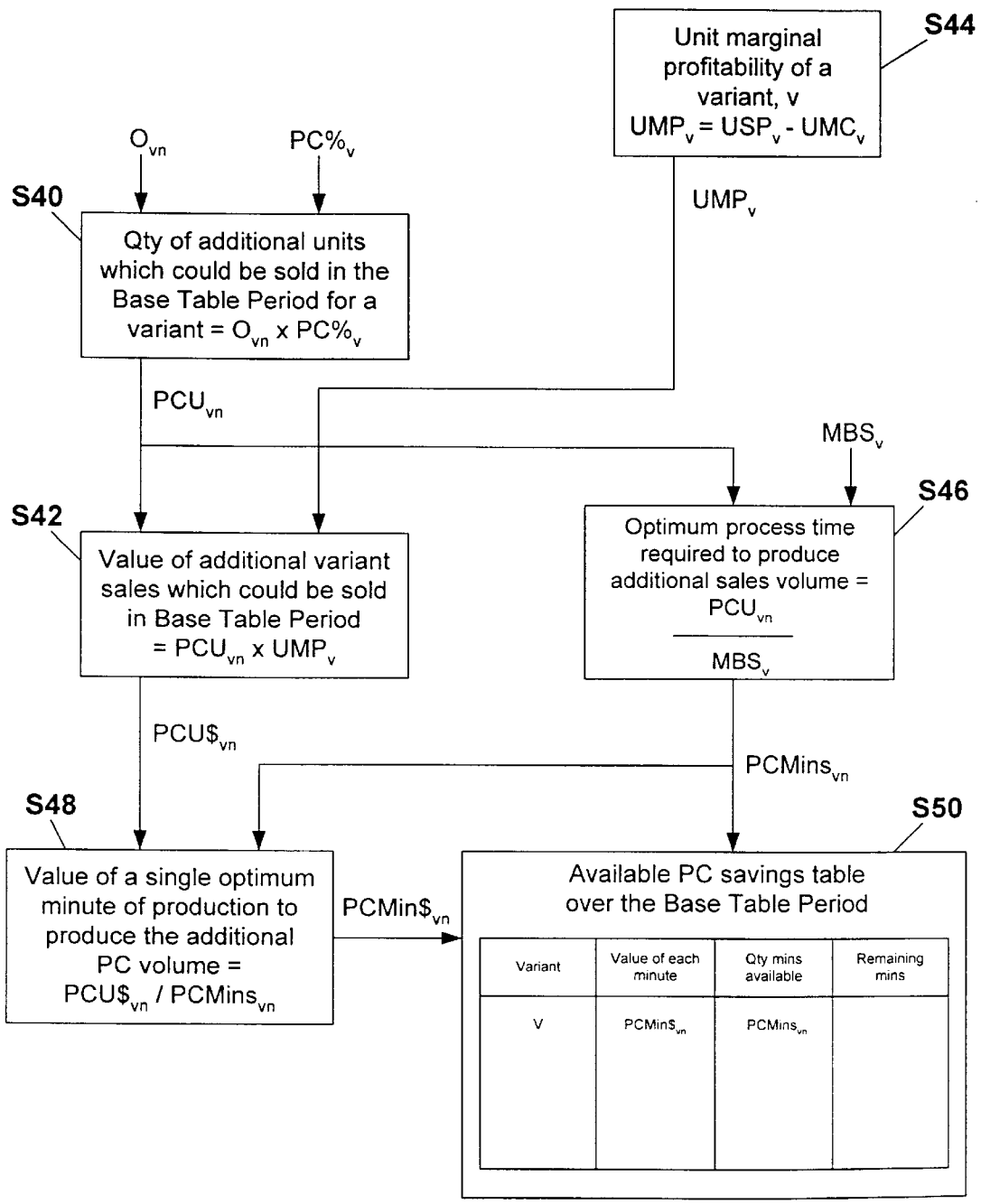
FIG. 20 is a flowchart showing the calculation of the available production constrained savings table over the base table period.

Refer to FIG. 20, $PCU_{vn}$, The quantity of additional volume of a variant v which could be sold over the BTP is calculated as follows. The output of variant v over the BTP, $O_{vn}$, and the percentage of units which could potentially be sold if they were made, $PC\%_v$—expressed as a percentage of current production, are obtained from database 15. $PCU_{vn}$ is found by multiplying $PC\%_v$ by $O_{vn}$. Step S40.

Next, $PCU\$_{vn}$, the value (total profit) of the additional units of variant v which could be sold, is calculated by multiplying $PCU_{vn}$ by the unit marginal profitability $UMP_v$ of variant v. Step S42. The unit marginal profitability, $UMP_v$, calculated at Step S44, is the difference between the unit sales price of a variant, $USP_v$, and the unit marginal manufacturing cost, $UMC_v$, both of which are stored in database 15.

$PCMins_{vn}$, the optimum process time required to produce the additional variants is then calculated by dividing the quantity of additional variants which could be sold, $PCU_{vn}$, by the maximum bottleneck speed for the particular variant, $MBS_v$ (stored in database 15). Step S46.

Finally, $PCMins\$_{vn}$, the value of each optimum process minute, if used to produce the additional sales volume of variant v, is calculated. This is done by dividing the value of the additional units of variant v, $PCU\$_{vn}$, by the optimum process time required to produce those additional variants, $PCMins_{vn}$. Step S48.

These steps are repeated for all variants which were produced in the base table period and the Available Production Constrained Savings Table is built. Step S50. The variants are arranged in the table shown in Step S50 in descending order by $PCMins\$_{vn}$, the value of each optimum process minute. The table has four columns, namely variant identification, v, value of optimum process minute for variant v, $PCMins\$_{vn}$ and number of optimum process minutes available for producing variant v, $PCMins_{vn}$. The fourth column, Remaining minutes, is empty at this stage, but will be used later.

Figure 21:
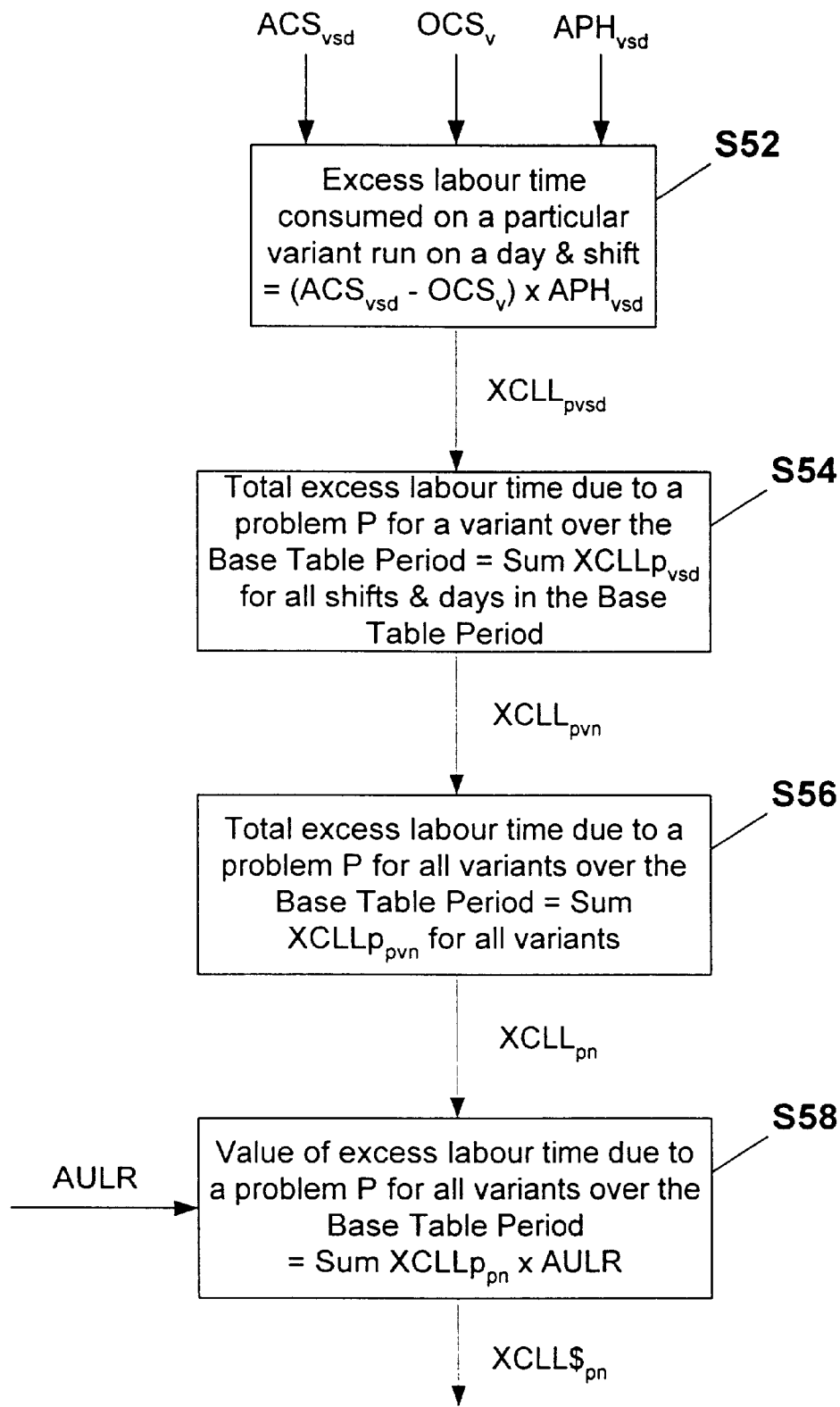
FIG. 21 is a flowchart showing the calculation of the value of lost labor time caused by a problem over the base table period.

2. Valuing the Excess Crewing Component of a Problem p over a Base Table Period:

Refer to FIG. 21. An important step in the valuation of the excess crewing component of a problem is determining $XCLL_{pvn}$, the total number of labor hours due to an excess crewing problem, p with variant v, over the base table period. This is done by first determining $XCLL_{pvsd}$, the lost labor hours due to excess crewing over a production run and then summing it over the base table period. $XCLL_{pvsd}$, is determined by finding the difference between the optimum crew size, $OCS_v$, and the actual crew size $ACS_{vsd}$ and multiplying by the actual processing time of the run, $APH_{vsd}$, for all variants v over the production run. Step S52. $OCS_v$ was stored in database 15 during the modeling of the process and $ACS_{vsd}$ and $APH_{vsd}$, the actual processing time of the run were acquired and entered into the database at the end of the production run. Having determined $XCLL_{pvsd}$, the total number of labor hours due to an excess crewing problem over the production run, the total excess labor time due to a problem p for a variant over the base table period, $XCLL_{pvn}$ is found by summing $XCLL_{pvsd}$ over all shifts and days in the base table period. Step S54. The total lost labor hours for the whole process $XCLL_{pn}$ is then found by summing $XCLL_{pvn}$, for all variants in the process. Step S56.

The lost labor time due to an excess crewing problem, $XCLL\$_{pn}$, is valued by multiplying $XCLL_{pn}$ by AULR, the all up labor rate for the process (previously stored in database 15 during the modeling stage). Step S58.

3. Valuation of Downtime, Slow Running and Bottleneck Waste Problems:

A typical process has three sources of lost process time—downtime (i.e. when the process stops entirely), slow running (i.e. when the process runs at rate slower than the optimum rate) and bottleneck waste (i.e. when product is produced at the speed bottleneck, but must be discarded, thus wasting processing time).

The manner of valuation of the lost process time depends on whether the process is production constrained or sales constrained. A process is production constrained when the company is able to sell more of the product than it can produce. It is sales constrained when the company cannot sell any more than it can produce. If the process is production constrained, then some or all lost process time could have been used to make additional product, had the process being operating at its optimum level. The lost process time can therefore be valued in terms of the marginal profitability of the additional product. This is done by determining the value of a unit of time, assuming the process to be operating at its optimum level. If the process is sales constrained, then lost process time is valued in terms of labor cost savings which would result from improving the process efficiency.

In any case, the lost process time is initially valued by means of a method called the "Lost Production Cost Evaluation Method" also referred to as the "Production constrained Valuation Method" which is a module of application 13. The Lost Production Cost Evaluation Method values as many of the lost process minutes as possible in terms of marginal profitability and outputs a value of the lost process time. Any remaining time is also output to be valued as wasted labor time.

a. The Lost Production Cost Evaluation Method:

The program module which implements the Lost Production Cost Evaluation Method uses as inputs the data in the Production Constrained Savings Table described above, and $OPM_{pn}$, a quantity of lost optimum process minutes due to problem p. The outputs of the program module are $OPM\$_{pn}$, the maximum value of all or part of the input lost process minutes and $OPMR_{pn}$, the quantity of lost process minutes which remains unvalued at the end of the algorithm.

Figure 22:
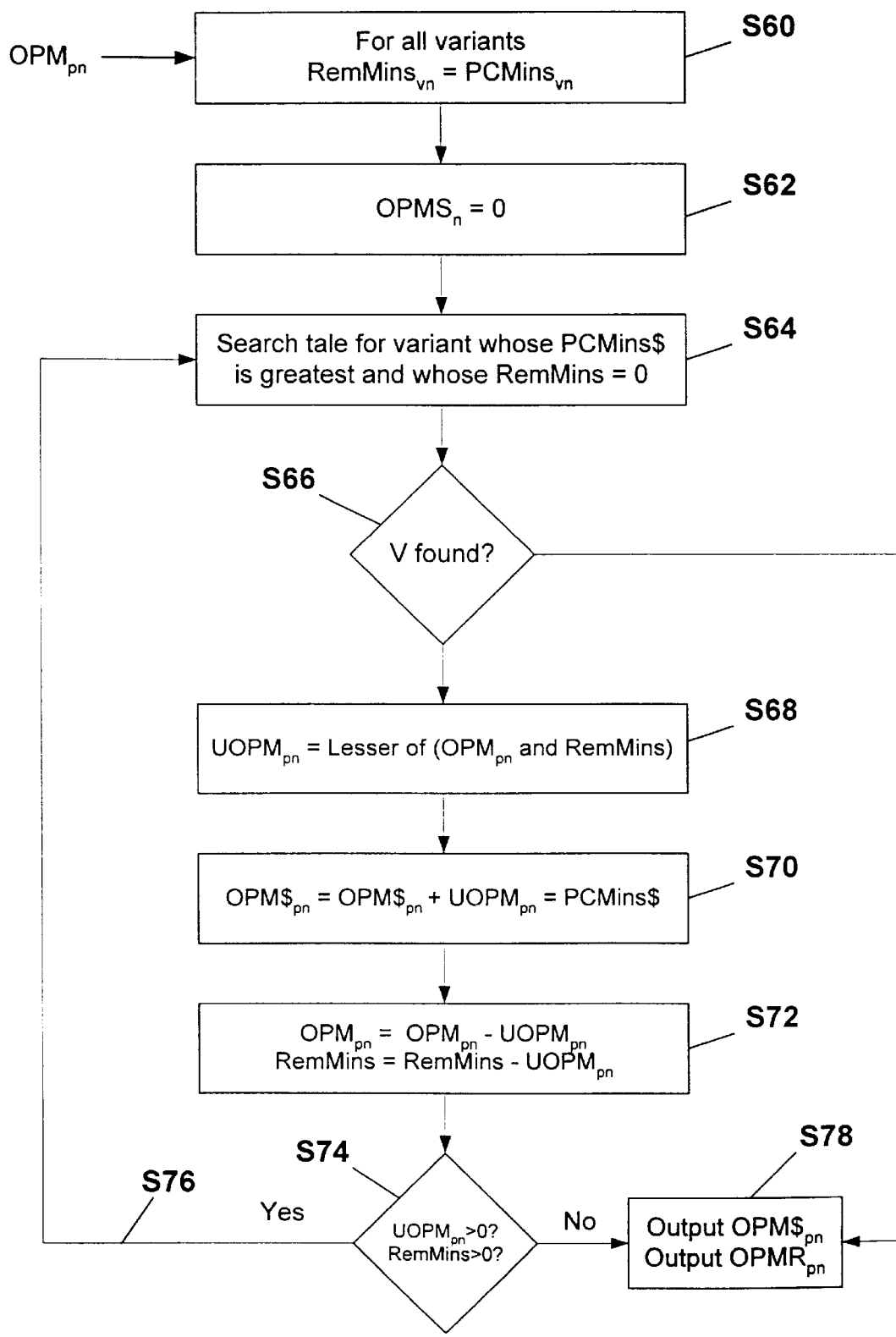
FIG. 22 is a flowchart showing the lost production cost evaluation method.

Referring to FIG. 22, the basic steps in the Lost Production Cost Evaluation Method are:

1. Copy the contents of the $PCMins_{vn}$ column of the Available Production Constrained Savings Table into a new column called RemMins (i.e. remaining minutes). Step S60.
2. Initialize the lost optimum process minute value as zero (i.e. $OPM\$_{pn}=0$). Step S62.
3. Locate the variant in the Available Production Constrained Savings Table whose production constrained minute value, $PCMins\$_{vn}$, is greatest and whose RemMins value is greater than zero. Step S64. If there is no such variant, then the valuation is complete (i.e. the variant is sales constrained). The program outputs $OPMR_{pn}$, otherwise, the program continues. Step S66.
4. For the variant selected in step S64, determine the lesser of the quantity of optimum process minutes to be valued, $OPM_{pn}$ and RemMins. This is called the "usable optimum process minutes," $UOPM_{pn}$ because these minutes are production constrained—they can be used to produce more variants which can be sold. Step S68.
5. Multiply the usable optimum process minutes, $UOPM_{pn}$, by the production constrained minute value, PCMmins$ and add the product to the lost optimum process minute value, $OPM\$_{pn}$. Step S70.
6. Deduct usable optimum process minutes, $UOPM_{pn}$ from both the values in the input lost optimum process minutes, $OPM_{pn}$ and the RemMins columns. Step S72.
7. If both the optimum process minutes, $OPM_{pn}$ and RemMins are greater than zero, then return to step S64. Steps S74 and S76. Otherwise the evaluation is complete and the lost optimum process minute value, $OPM\$_{pn}$ and remaining optimum process minutes, $OPMR_{pn}$ (i.e. those that have not yet been valued) are output. Step S78.

b. Valuing the Process Downtime Component of a Problem p over the BTP:

There are two components to the cost of a downtime problem. The first, and most significant, occurs where the lost time could have been utilized to produce more units which could have been sold. If none or only some of the units could be sold, the remaining component of downtime loss is the cost of labor while the process is down. The total downtime is the sum of these two components.

Figure 23:
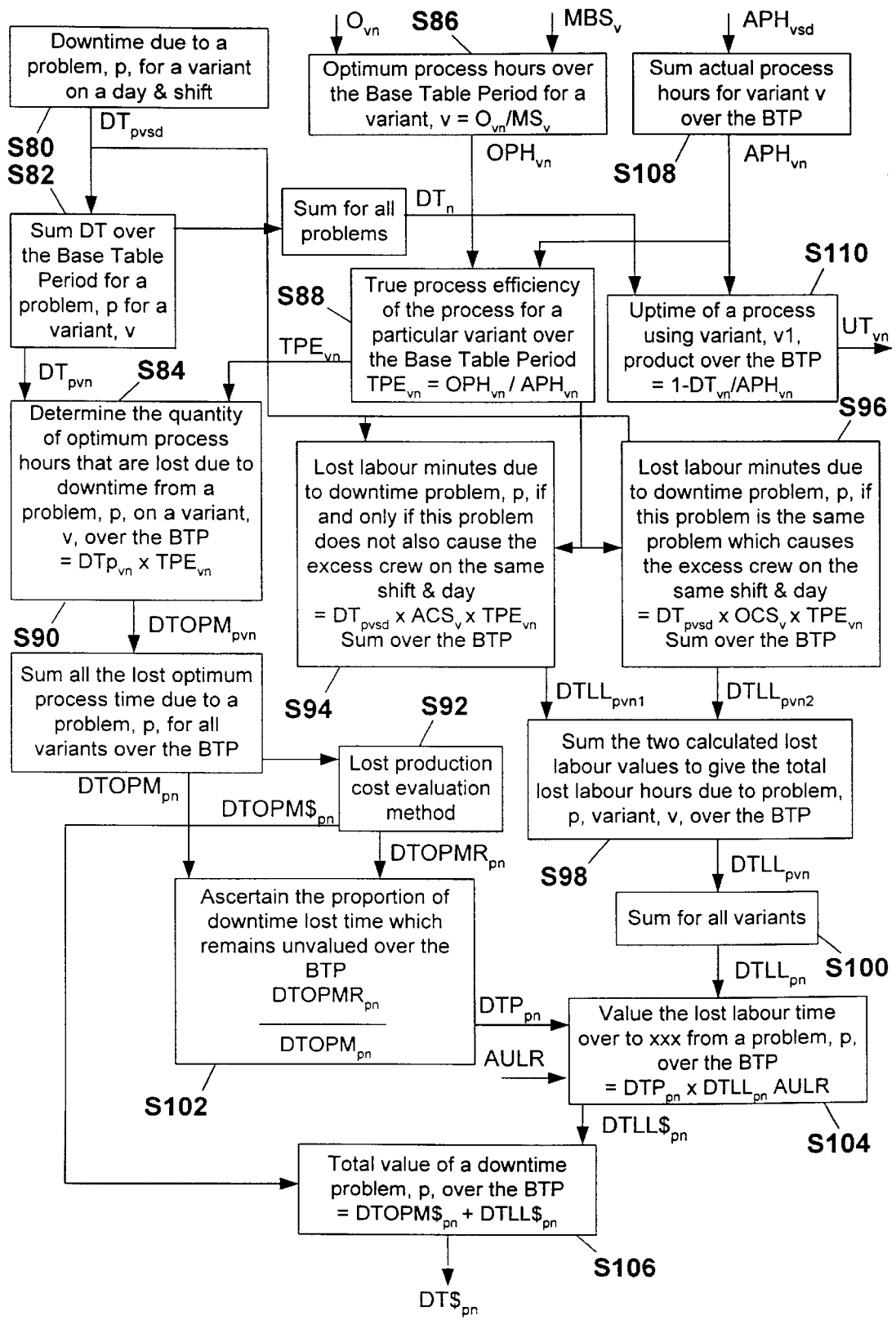
FIG. 23 is a flowchart showing the calculation of the value of the downtime component of a problem over the base table period.

Refer now to FIG. 23. The first step is the determination of how many optimum process hours were lost over the BTP due to process downtime. $DT_{pvsd}$, the downtime due to a problem p for variant v on a day and shift is retrieved from the database (it was entered at the end of a shift). Step S80. This is summed over the BTP, to give $DT_{pvn}$, the downtime for a variant v due to problem p. Step S82. $DTOP_{pvn}$, the number of optimum process hours lost due to downtime from a problem p with variant v over the base table period is found by multiplying $DT_{pvn}$ by $TPE_{vn}$, the true process efficiency for a particular variant over the BTP. Step S84.

True process efficiency is the number of optimum process hours for variant v over the BTP, $OPH_{vn}$, divided by the actual process hours over the BTP, $APH_{vn}$. Step S88. $APH_{vn}$ is input at the data input stage. $OPH_{vn}$ is found by dividing the output of the variant over the BTP, $O_{vn}$, by the maximum bottleneck speed, $MBS_v$. S86.

This process is repeated for all variants. $DTOP_{pn}$, the total lost optimum process hours due to a downtime problem p is found by summing $DTOP_{pvn}$ over all variants. Step S90. These minutes are input to the Lost Production Cost Evaluation Method program module and thus valued. Step S92. See FIG. 22.

The second component of downtime loss is lost labor hours. Lost labor hours are found by summing over the BTP, the labor hours lost in each production run. The lost labor hours for a production run will vary depending on whether the downtime problem is also an excess crewing problem in that run. If the downtime problem is also an excess crewing problem, then the downtime lost labor hours, $DTLL_{pvn1}$, is the product of the downtime due to problem p, $DT_{pvsd}$, the actual crew size, $ACS_{vsd}$ and the true process efficiency, $TPE_{vn}$. Step S94. If the downtime problem is not an excess crew problem, then the downtime lost labor hours, $DTLL_{pvn2}$, is the product of the downtime due to problem p, $DT_{pvsd}$, the optimum crew size, $ACS_{vsd}$ and the true process efficiency, $TPE_{vn}$. Step S96. These values are calculated for each production run, and summed to give $DTLL_{pvn}$, the total downtime labor loss for variant v over the BTP for a particular problem. Step S98. $DTLL_{pvn}$ is then summed for all variants to give $DTLL_{pn}$, the total downtime lost labor due to problem p. Step S100.

It will be recalled that the Lost Production Cost Evaluation Method program module output a value of downtime optimum process minutes, $DTOPM\$_{pn}$ and an amount of time which could not be valued, $DTOPMR_{pn}$, due to the fact that market conditions dictated that a fixed quantity of each variant could be sold. Those remaining process minutes are valued as lost labor hours in the following manner: First, the proportion of lost labor hours which remain unvalued is determined at Step S102, by dividing the remaining process minutes, $DTOPMR_{pn}$ by the total lost process time due to downtime problem p, $DTOPM_{pn}$ (previously calculated at Step S90). The proportion of unvalued downtime, $DT_{pn}$, is then multiplied by the total downtime labor loss due to problem p, $DTLL_{pn}$ and then by the all up labor rate for the process, AULR. Step S104. This gives $DTLL\$_{pn}$, the value of the lost labor due to downtime problem p.

The total value of a downtime problem p over the BTP, $DT\$_{pn}$, is the sum of the value of the lost optimum process minutes due to the problem, $DTOPM\$_{pn}$ and the value of the lost labor $DTLL\$_{pn}$. Step S106.

c. Valuing the Process Slow Running Component of a Problem p, over the BTP:

As in the case of a downtime problem, a problem which causes slow running has two possible cost components: the cost of lost production and the cost of wasted labor.

In order to value the cost of production losses due to slow running, the total amount of optimum process time lost due to the problem during the BTP must be found. For a single production run, the lost optimum process time due to a slow running problem is found by first ascertaining how many production units of variant v were not produced because of the problem.

The proportional process uptime during the production run, $UT_{vn}$, is found by summing the total downtime for all problems, $DT_{vn}$ (Step S108 in FIG. 23), dividing by the actual processing time in the BTP, $APH_{vn}$ and subtracting the result from 1. Step S110, FIG. 23.

Figure 24:
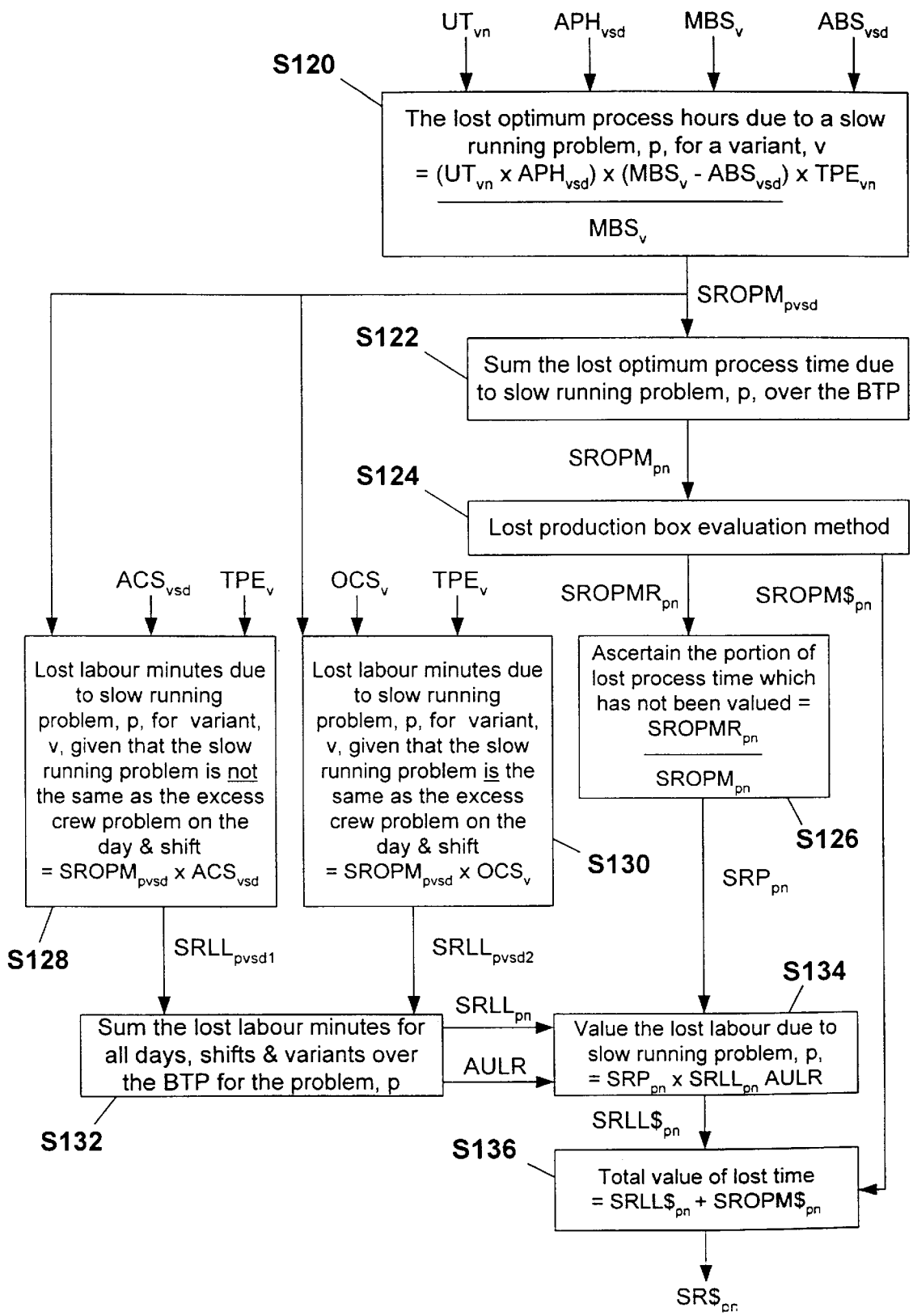
FIG. 24 is a flowchart showing the calculation of the value of the slow running time component of a problem over the base table period.

The lost optimum process time due to slow running problem p, for variant v, is calculated by first multiplying the proportional process uptime during the production run $UT_{vn}$, by the actual processing time $APH_{vsd}$. The result is multiplied by the difference between the maximum bottleneck speed of the variant, MBSV, and the actual bottleneck speed, $ABS_{vsd}$, of the production run. The result is converted into lost optimum processing time, $SROPM_{vsd}$, by dividing the result by the maximum bottleneck speed $MBS_v$ and then multiplying by the true process efficiency, $TPE_{vn}$. Step S120. See FIG. 24.

$SROPM_{pvsd}$ is then summed for all production runs in which the same slow running problem p occurred over the BTP to give $SROPM_{pn}$, the total lost optimum process time due to slow running problem p over the BTP. Step S122.

In order to value $SROPM_{pn}$, it is fed into the Lost Production Cost Evaluation Method program module shown in FIG. 22. Step S124. The resulting value of lost production due to a slow running problem is $SROPM\$_{pn}$ (i.e. output $OPM\$_{pn}$ of the Lost Production Cost Evaluation Method program module). If there is any remaining unvalued lost optimum process time $SROPMR_{pn}$ (i.e. output $OPMR_{pn}$ of the Lost Production Cost Evaluation Method program module is greater than zero), it is valued as lost labor time, in a manner which will now be described.

The proportion of lost process time which has not been valued, $SRP_{pn}$, is determined by dividing $SROPMR_{pn}$ by $SROPM_{pn}$, the total lost optimum process time due to problem p over the BTP. Step S126. Next, the total quantity of lost labor time attributed to the slow running problem p is calculated. For each production run, the quantity of lost optimum process hours is $SROPM_{pvsd}$, which was calculated at Step S120. This is converted into lost labor time $SRLL_{pvsd1}$, by multiplying it by the actual crew size, $ACS_{vsd}$, for the variant being produced if the slow running problem is not the same as the excess crew problem on that day and shift. Step S128. If the slow running problem is the same as the excess crew problem on that day and shift, then lost labor time, $SRLLP_{pvsd2}$, is $SROPM_{pvsd}$ multiplied by the optimum crew size, $OCS_{vsd}$. Step S130. This avoids double counting of lost labor time. Steps S120, S128 and S130 are repeated for each production run in the BTP where the slow running problem occurs, and the resulting values of $SRLL_{pvsd}$ are summed to give $SRLL_{pn}$, the total lost labor time due to slow running problem p. Step S132.

The dollar value of lost labor time due to slow running problem p is the product of $SRP_{pn}$, the proportion of optimum process hours which were not valued by the Lost Production Cost Evaluation Method, and $SRLL_{pn}$, the total lost labor time due to the slow running problem, and AULR, the all up labor rate. This value is called $SRLL\$_{pn}$. Step S134.

The total dollar value of the slow running component, $SR\$_{pn}$, is determined by adding the lost production component $SROPM\$_{pn}$ and the lost labor component $SRLL\$_{pn}$. Step S136.

d. Calculation of the Bottleneck Waste Component of Problem p over the BTP:

Bottleneck waste is product which is produced at or after the speed bottleneck, but which must be scrapped. As in the case of downtime and slow running problems, the value of bottleneck waste is made up of two components, lost production and lost labor.

Figure 25:
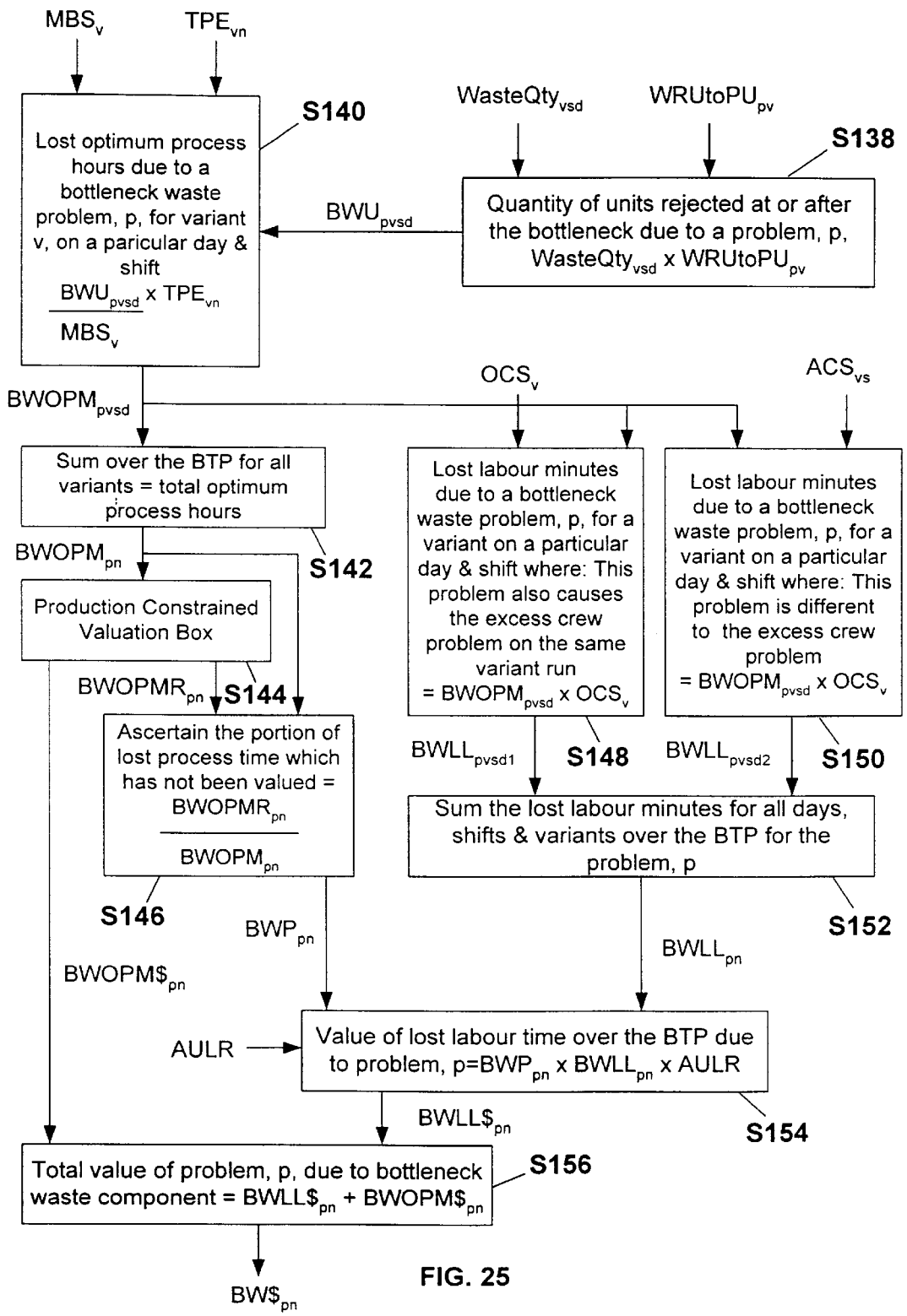
FIG. 25 is a flowchart showing the calculation of the value of the bottleneck waste component of a problem over the base table period.

Refer to FIG. 25. Lost production is valued as follows: $BWOPM_{pvsd}$, the amount of optimum process time lost due to a bottleneck waste problem p, in a particular production run is calculated by dividing $BWU_{pvsd}$, the number of production units wasted, by $MBS_v$, the maximum bottleneck speed for the variant and multiplying by true process efficiency, $TPE_v$. S140. $BWU_{vsd}$ is calculated by multiplying the quantity of units of the variant rejected at or after the bottleneck ($WasteQty_{vsd}$") ascertained at the data input stage by the waste reporting unit to production unit factor ("$WRUtoPUP_{pv}$") input at the modeling stage. $BWOPM_{pvsd}$ is summed for all production runs in the BTP in which the bottleneck waste problem p occurred, giving $BWOPM_{pn}$, the total amount of optimum process time lost due to bottleneck waste problem p. Step S142.

$BWOPM_{pn}$ is then fed into the Lost Production Cost Evaluation Method program module (also referred to as the "Production Constrained Valuation Box"), which values as much of the lost optimum process time as possible, outputting $BWOPM\$_{pn}$. Step S144. The other output, $BWOPMR_{pn}$, the remaining lost process time, is valued as lost labor time.

First, the proportion of lost optimum process time which has not been valued is calculated by dividing $BWOPMR_{pn}$ by $BWOPM_{pn}$, the total lost optimum process time caused by the bottleneck waste problem p, giving $BWP_{pn}$. Step S146. Next, the total lost labor hours in a single production run due to bottleneck waste problem p is calculated. $BWOPM_{pvsd}$, the amount of optimum process time lost due to a bottleneck waste problem p, in a particular production run, is converted to lost process hours, $BWLL_{pvsd1}$, by multiplying $BWOPM_{pvsd}$ by the optimum crew size $OCS_v$, if the bottleneck waste problem is the same as the excess crew problem, see Step S148. $BWOPM_{pvsd}$ is multiplied by the actual crew size, $ACS_{pvsd}$, if the bottleneck waste problem is not the same as the excess crew problem, giving $BWLL_{pvsd2}$. Step S150. $BWLL_{pvsd1}$, and $BWLL_{pvsd2}$ are the total amount of lost labor time due to bottleneck waste problem p, in a particular production run or shift s and day d. $BWOPM_{pvsd}$ can also be calculated by dividing $BWU_{pvsd}$ by $MBS_v$.

$BWLL_{pvsd1}$ or $BWLL_{pvsd2}$, are summed over all production runs in the BTP, giving the total lost labor time due to bottleneck waste problem p, $BWLL_{pn}$. Step S152. This is valued by multiplying it by $BWP_{pn}$, the proportion of lost labor time due to bottleneck waste problem p which was unvalued (see Step S146) and AULR, the all up labor rate, resulting in $BWLL\$_{pn}$. Step S154. The total value of the bottleneck waste problem p over the BTP is calculated by adding the lost optimum production time value $BWOPM\$_{pn}$ and $BWLL\$_{pn}$ the lost labor value, resulting in $BW\$_{pn}$. Step S156.

Figure 26:
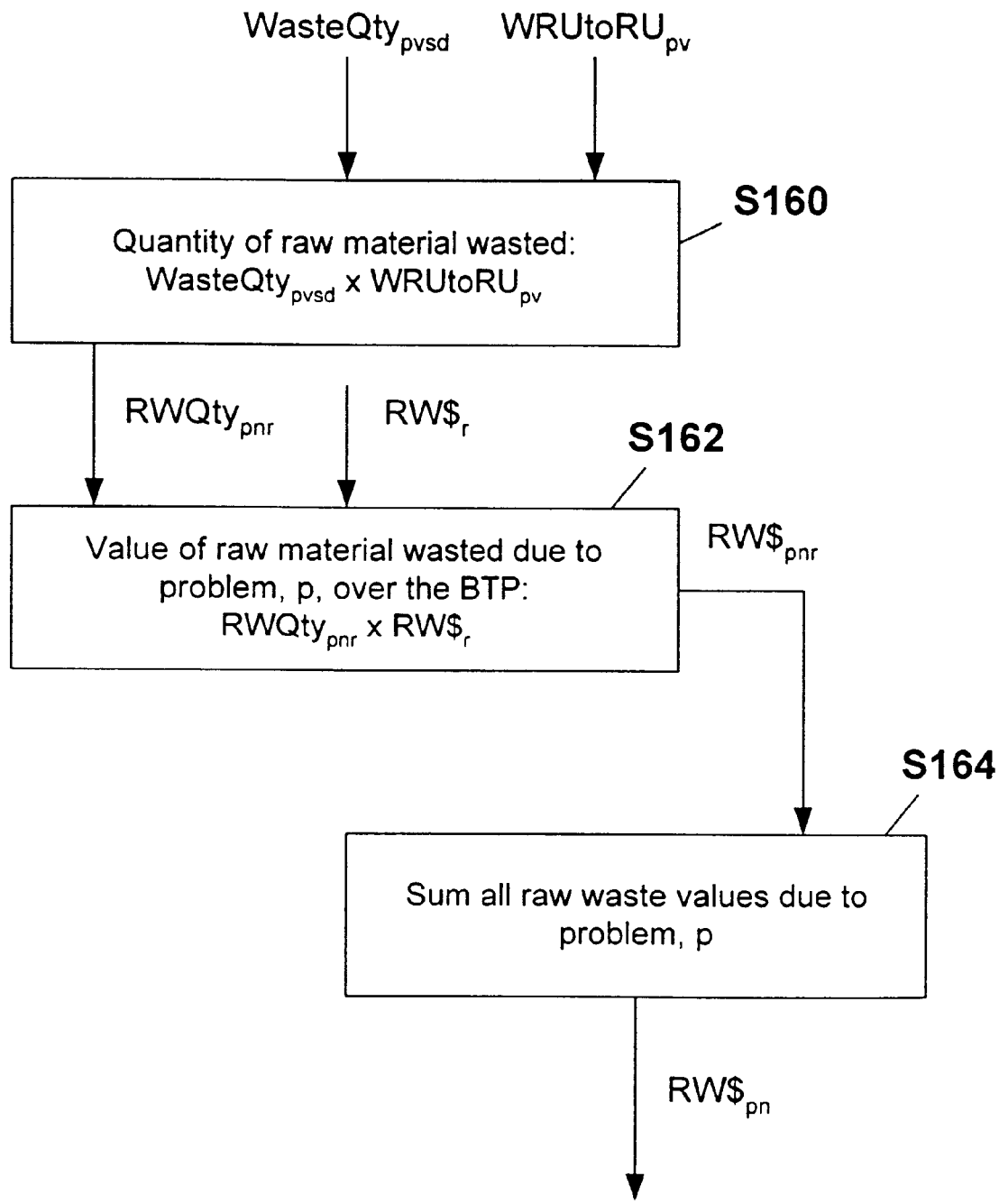
FIG. 26 is a flowchart showing the calculation of the value of the raw material waste component of a problem over the base table period.

4. Valuing the Wasted Raw Material Component of Problem p over the BTP:

Refer to FIG. 26. For each type of raw material wasted in the BTP due to problem p, the total quantity of raw material wasted over the BTP, $WasteQty_{pvsd}$ (input at the data input stage), is multiplied by the waste reporting unit to raw waste conversion factor ($WRUtoRU_{pv}$) to give a quantity of wasted raw material, ("$RWQty_{pnr}$"). S160. $RWQty_{pnr}$ is multiplied by $RW\$_{pnr}$(input at the modeling stage), the dollar value of a single unit of the material, to give "$RW\$_r$," the value of that type of raw material wasted. Step S162. This is repeated for all types of raw materials used and then summed to give $RW\$_{pn}$, the total value of raw material wasted due to problem p in the BTP. Step S164.

Figure 27:
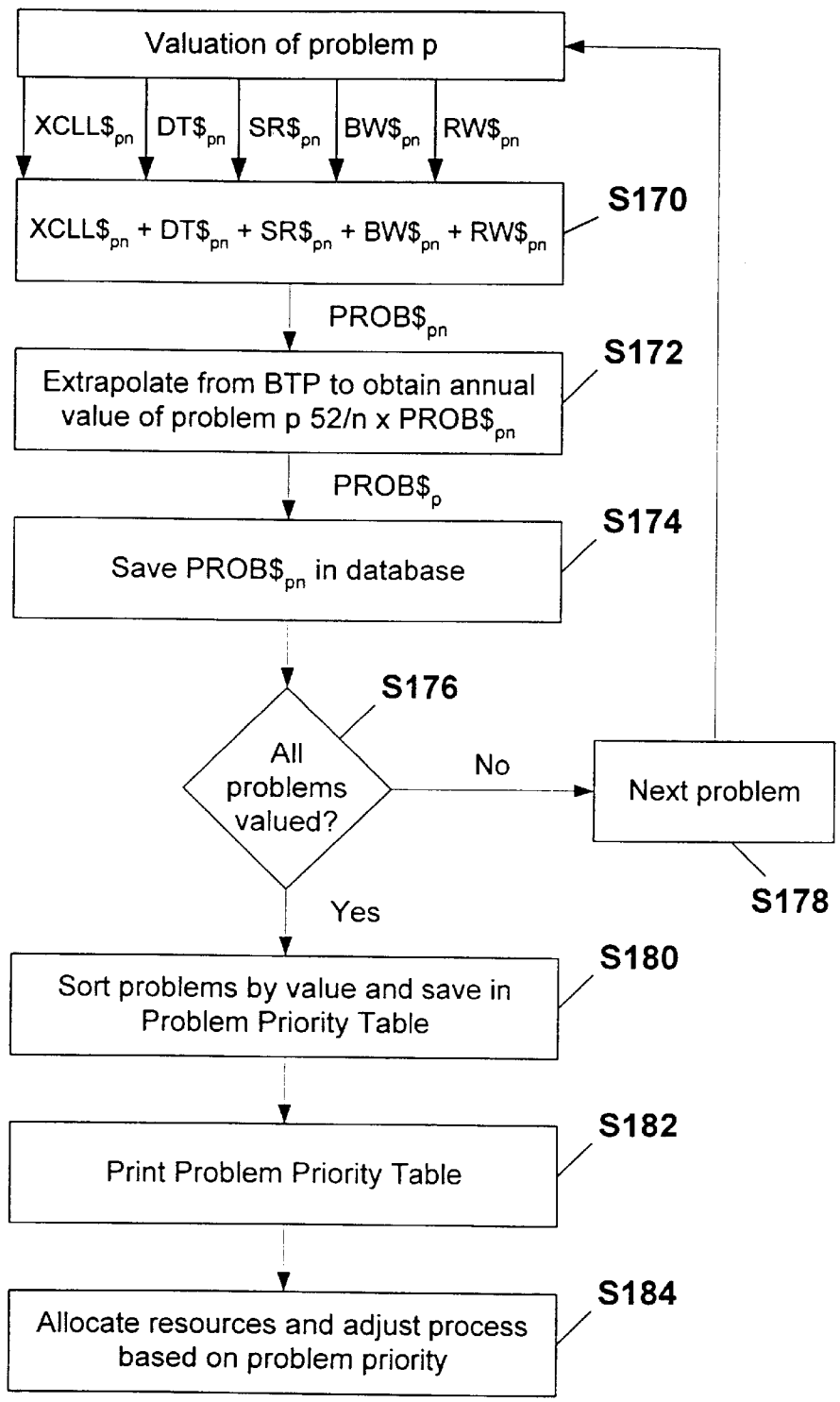
FIG. 27 is a flowchart showing the summing of the components of the value of a problem over the base table period, the extrapolation of the value and the prioritizing of the problem based on its value.

5. Summing the Total Value of Problem P over the BTP:

All components of the cost of problem p have now been determined over the BTP. The total value of the problem is found by adding all the components, i.e. values of excess crew, $XCLL\$_{pn}$, downtime $DT\$_{pn}$, slow running, $SR\$_{pn}$, bottleneck waste, $BW\$_{pn}$, and raw materials, $RW\$_{pn}$, giving $PROB\$_{pn}$, the total value of the problem p. Step S170 in FIG. 27.

6. Extrapolating the Cost of Problem p over a Year:

$PROB\$_{pn}$ is now extrapolated from the BTP to an entire year by multiplying it by 52 weeks and dividing by the number of weeks in the BTP, typically five. The result is the total value of problem p over an entire year, $PROB\$_p$. Step S172 in FIG. 27. $PROB\$_p$ is saved in a table in the database. Step S174.

7. Repeating Steps 1–8 for All Problems in the Process over the BTP:

The steps which have just been described are repeated for all of the problems in the process. Steps S176 and S178.

8. Sorting the Problems by Total Value to generate the Problem Priority Table:

The results which were stored in the table are now sorted such that the problem which has the highest value is at the top of the table and remaining problems are stored in decreasing order of value. Step S180. This is the "Problem Priority Table." The Problem Priority Table is then printed out. Step S182. The plant management can then decide which of the problems to work on and allocate resources in accordance with the values of the problems. Step S184.

While the invention has been described with reference to its preferred embodiment, it will be appreciated by those of ordinary skill in the art that various modifications can be made to the preferred embodiment without departing from the spirit of the invention or limiting its scope.

We claim:

1. A method of controlling a process for producing product, the process being designed to run at an optimum performance, the method comprising the steps of:

identifying a problem in the process, which problem causes the process to perform at less than the optimum performance, thereby causing the process to lose processing time;

identifying a bottleneck in the process, such that the bottleneck dictates the maximum speed at which the process runs;

determining how much processing time the process loses due to the problem by the steps of:

determining a slow running time for the problem indicative of how much processing time the process loses due to the problem causing the bottleneck to run at a speed slower than an expected speed;

determining a downtime for the problem indicative of how much processing time the process loses due to the problem causing the bottleneck to stop running;

determining a bottleneck waste time for the problem indicative of how much processing time the process loses due to the problem causing product to be scrapped at or after the bottleneck;

calculating a financial value of the problem based on how much processing time the process loses due to the problem;

prioritizing the problem based on the financial value of the problem.

2. The method of claim 1 wherein the step of calculating a financial value of the problem comprises the step of determining financial values of the slow running time, downtime and bottleneck waste time for the problem.

3. The method of claim 1 wherein the step of calculating a financial value of the problem comprises the step of valuing the processing time lost due to the problem based on marginal profitability of the product.

4. The method of claim 1 further comprising the step of deciding whether to correct the problem based on the financial value of the problem.

5. The method of claim 1 further comprising the step of allocating resources to the problem based on the financial value of the problem.

6. The method of claim 1 wherein the step of calculating a financial value of the problem comprises the step of valuing the problem by taking into account how much crew operates the process due to the problem.

7. The method of claim 1 wherein the step of calculating a financial value of the problem comprises the step of valuing the problem by taking into account how much raw material the process uses due to the problem.

8. A computer system for controlling an process for producing product, the process being designed to run at an optimum performance and wherein the process suffers from a plurality of problems which cause the process to run at less than the optimum performance, thereby causing the process to lose processing time, the computer system comprising:

means for inputting modeling data relating to the process, thereby building a computer model of the process;

means for inputting performance data obtained by monitoring performance of the process;

means for identifying a bottleneck in the process such that the bottleneck limits a maximum speed at which the process runs;

means for determining a financial value of each of the plurality of problems, the means comprising:

means for determining an amount of processing time the process loses due to a problem of the plurality of problems comprising:

means for determining a slow running time for the problem, the slow running time being indicative of how much processing time the process loses due to the problem causing the bottleneck to run at a speed slower than an expected speed;

means for determining a downtime for the problem, the down time being indicative of how much processing time the process loses due to the problem causing the bottleneck to stop running;

means for determining a bottleneck waste time for the problem, the bottleneck waste time being indicative of how much processing time the process loses due to the problem causing product to be scrapped at or after the bottleneck;

means for valuing the problem based on the amount of the processing time lost due to the problem.

9. The computer system of claim 8 wherein the means for valuing the problem based on the amount of processing time the process loses due to the problem further comprises means for calculating financial values of the slow running, downtime and bottleneck waste times.

10. The computer system of claim 8 wherein the means for valuing the problem based on the amount of processing time the process loses due to the problem further comprises means for valuing the amount of processing time the process loses due to the problem based on marginal profitability of the product.

11. The computer system of claim 8 wherein the performance data comprises labor data relating to an amount of additional labor used in the process due to each of the plurality of problems and wherein the means for determining a financial value for each of the plurality of problems comprise means for valuing the problem based on the labor data.

12. The computer system of claim 8 wherein the performance data comprises raw material data comprising data relating to an amount of additional raw material used by the process due to each of the plurality of problems and wherein the means for determining a financial value of each of the plurality of problems comprise means for valuing the problem based on the raw material data.

13. A method of controlling a process for producing product, the process being designed to run at an optimum performance, the method comprising the steps of:

identifying a problem in the process, which problem causes the process to run at less than the optimum performance;

identifying a bottleneck in the process, such that the bottleneck dictates the maximum speed at which the process runs;

determining a slow running time for the problem indicative of how much processing time the process loses due to the problem causing the bottleneck to run at a speed slower than an expected speed;

determining a downtime for the problem indicative of how much processing time the process loses due to the problem causing the bottleneck to stop running;

determining a bottleneck waste time for the problem indicative of how much processing time the process loses due to the problem causing product to be scrapped at or after the bottleneck;

determining financial values of the slow running time, the downtime and the bottleneck waste time for the problem;

determining how much the problem reduces profitability of the process based on the financial values of the slow running time, the downtime and the bottleneck waste time for the problem;

prioritizing the problem based on how much the problem reduces profitability of the process.

14. The method of claim 13 wherein the step of determining how much the problem reduces profitability of the process comprises summing the financial values of the slow running time, the downtime and the bottleneck waste time for the problem.

15. The method of claim 13 wherein the step of calculating a financial value of the problem further comprises the step of determining how much additional labor cost is incurred due to the problem.

16. The method of claim 13 wherein the step of calculating a financial value of the problem further comprises the step of determining how much additional raw material is used due to the problem.

17. The method of claim 13 further comprising the step of deciding whether to correct the problem based on how much the problem reduces profitability of the process.

18. The method of claim 13 further comprising the step of allocating resources to the problem based on how much the problem reduces profitability of the process.

19. A method of controlling a process for producing product, the process being designed to run at an optimum performance, the method comprising the steps of:

identifying a problem in the process, which problem causes the process to perform at less than the optimum performance, thereby causing the process to lose processing time;

identifying a bottleneck in the process, such that the bottleneck dictates the maximum speed at which the process runs;

determining how much processing time the process loses due to the problem by the steps of:

determining a slow running time for the problem indicative of how much processing time the process loses due to the problem causing the bottleneck to run at a speed slower than an expected speed;

determining a downtime for the problem indicative of how much processing time the process loses due to the problem causing the bottleneck to stop running;

determining a bottleneck waste time for the problem indicative of how much processing time the process loses due to the problem causing product to be scrapped at or after the bottleneck;

determining a lost labor time indicative of how much labor time is lost due to the problem;

determining how much raw material the process uses due to the problem;

calculating a financial value of the problem based on how much processing time the process loses due to the problem, the lost labor time and how much raw material the process uses due to the problem;

prioritizing the problem based on the financial value of the problem.

20. A method of controlling a process for producing product, the process being designed to run at optimum performance, the method comprising the steps of:

identifying a problem in the process, which problem causes the process to perform at less than the optimum performance;

identifying a bottleneck in the process, such that the bottleneck dictates the maximum speed at which the process runs;

determining a slow running time for the problem indicative of how much processing time the process loses due to the problem causing the bottleneck to run at a speed slower than an expected speed;

determining a downtime for the problem indicative of how much processing time the process loses due to the problem causing the bottleneck to stop running;

determining a bottleneck waste time for the problem indicative of how much processing time the process loses due to the problem causing product to be scrapped at or after the bottleneck;

determining a lost labor time indicative of how much labor time is lost due to the problem;

determining how much raw material the process uses due to the problem;

determining financial values of the slow running time, the downtime, the bottleneck waste time, the lost labor time and how much raw material the process loses due to the problem;

determining how much the problem reduces profitability of the process based on the financial values;

prioritizing the problem based on how much the problem reduces profitability of the process.

* * * * *